(12) United States Patent
Abrosimov et al.

(10) Patent No.: US 7,092,439 B2
(45) Date of Patent: Aug. 15, 2006

(54) MEANS AND METHOD OF DATA ENCODING AND COMMUNICATION AT RATES ABOVE THE CHANNEL BANDWIDTH

(75) Inventors: Igor Anatolievich Abrosimov, St. Petersburg (RU); Alexander Roger Deas, Edinburgh (GB); Gordon Faulds, Dursley (GB)

(73) Assignee: Acuid Corporation (Guernsey) Limited, Guernsey (GB)

(*) Notice: Subject to any disclaimer, the term of this patent is extended or adjusted under 35 U.S.C. 154(b) by 794 days.

(21) Appl. No.: 10/079,260

(22) Filed: Feb. 21, 2002

(65) Prior Publication Data

US 2003/0147461 A1 Aug. 7, 2003

(30) Foreign Application Priority Data

Feb. 1, 2002 (GB) ............................ 0202366.1

(51) Int. Cl.
*H03K 7/08* (2006.01)
*H03M 5/08* (2006.01)
*G06F 13/12* (2006.01)

(52) U.S. Cl. ............................ 375/238; 341/53; 710/66

(58) Field of Classification Search ................ 375/238; 341/53, 95, 59; 710/66, 89, 181
See application file for complete search history.

(56) References Cited

U.S. PATENT DOCUMENTS

| 4,864,303 | A  | * | 9/1989  | Ofek ........................... 341/95 |
| 6,311,239 | B1 | * | 10/2001 | Matthews ..................... 710/66 |
| 6,469,645 | B1 | * | 10/2002 | Coene .......................... 341/59 |
| 6,806,817 | B1 | * | 10/2004 | Abrosimov ................... 341/53 |

* cited by examiner

*Primary Examiner*—Khai Tran
*Assistant Examiner*—Cicely Ware

(57) ABSTRACT

The present invention relates to the reduction of artifacts introduced by sending data at a higher rate than the bandwidth of the communication channel, such as the voltage and current offsets introduced in the data at the receiver as a function of the preceding data.

22 Claims, 4 Drawing Sheets

MEANS AND METHOD OF DATA ENCODING AND COMMUNICATION AT RATES ABOVE THE CHANNEL BANDWIDTH

BACKGROUND OF THE INVENTION

1. Technical Field

The present invention relates to the communication of signals, in particular, to the transmission and reception of digital signals. More specifically, the present invention relates to encoding and decoding the data being sent to reduce the offset of the signal around the sampling threshold voltage when the data rate is above the bandwidth of the channel.

The present invention is particularly applicable to interfaces between integrated circuits and for high speed communications, such as currently addressed by Asynchronous Transfer Mode (ATM), Gigabit Ethernet, 3GIO, RapidIO, Hyperchannel and Fibre Transmission Channels, and makes possible yet higher data rates for a particular bandwidth of the transmission medium.

2. Background of the Invention

As the operating frequency of complex digital communication and data transfer systems increases, one of major technical challenge has been to improve the data transmission when the data rate is about or exceeds the bandwidth of a communication channel. A conventional communication channel comprising a differential driver, such as an LVDS (Low Voltage Differential Signaling) driver, a production package for the integrated circuit such as a BGA (Ball Grid Array), a printed circuit board, a receiver packaged similarly with its ESD (Electronic Static Discharge) structure, acts together as a filter. In the example given of a LVDS driver, BGA, pcb trace, BGA and receiver ESD structure and input parasitics, will have a cut-off frequency of around 1 GHz, and with between 4 and 6 poles, the slope will be sharp. A signal at 6 GHz (or 12 Gbps) may only have 20% of the amplitude of a signal at 1 GHz (2 Gbps). A 20 GHz (40 Gbps) signal over a 2 GHz BW channel may have only 10% of the amplitude of the 2 GHz (4 Gbps) components.

The receiver commonly has a relatively fixed sampling threshold voltage or current. If the signal being transmitted is a sine wave, and small changes are introduced at the time the sine wave is transmitted, such as by channel calibration processes or simply jitter, the entire signal can shift such that none of the data points for a period after the time shift cross the sampling threshold. An example of this is shown in FIG. 2. In this plot, the signal at 6 GHz is sent through a channel with 1 GHz bandwidth, and then at the start of the third cycle, the data is shifted in the transmitter by 5 ps. The result is that at the receiver, the signal no longer crosses the threshold. This problem is related to the ratio of the bandwidth of the channel to the bandwidth of the data, and the degree of non-linearity in the channel, so a 12 Gbps signal sent over a channel with 1 GHz bandwidth will behave as shown in FIG. 2, but 40 Gbps over a 2 GHz BW channel would have much worse behaviour.

The problem gets even more complex when the signal is not an almost continuous sine wave but rather a data signal, such as in FIG. 3, in which the same 1 GHz bandwidth channel is shown, sending data which varies in bandwidth from 1 GHz to 6 GHz. A channel implemented using standard production packages, such as BGAs, 1 GHz bandwidth drivers and with the receiver having the normal 2 KV HBM (Human Body Model) ESD protection, will cause signals above 1 GHz to have a dramatic loss in amplitude. It is normal practice in such situations to equalise the channel by attenuating the lower frequencies, effectively increasing the channel bandwidth. However, the tolerance on the components in the channel and the number of poles, typically 4 to 6 even in a direct chip to chip link, limits greatly the practical use of equalization. The result is that the system must tolerate the filter response when sending data.

The limited ability to equalise the channel at a practical level means that above the pass band of the channel, the data will be attenuated. This attenuation can be managed using tracking receiver thresholds, however, the impulse response of the filter causes a more dramatic problem: the entire data signal shifts over a small number of cycles as a function of tiny amounts of phase noise or phase variations.

In a channel with 1 GHz bandwidth (BW), if the signal comprises a pattern at 1 GHz, then the driver and receiver will reach their saturated values. When the data pattern changes from a 1 GHz repetitive signal to a series of data bits equivalent to a 6 GHz repetitive signal, the speed of response depends on where in the sine wave the 1 GHz signals happens to be at the point of change. Each cycle of the 6 GHz signal represents a little over 1 radian of the 1 GHz signal. The 1 GHz signal normalised to +/− 1V, will change at a rate of 2V per nS over the radian centred on the sampling threshold, but less than $\frac{1}{12}^{th}$ of this over 1 radian of the cycle centred about the apex of the 1 GHz sinusoid. For the reader unfamiliar with Kalman filtering and signal processing, the received signal can be considered to have a momentum, determined by the impulse response of the channel filter characteristic. This means that a 1 unit time delay of the signal, imposed on the signal as it crosses the sampling threshold, will have 6 to 12 times the effect at the receiver than the same unit time delay of the signal as it is at its apex, where the unit of time is a very small number.

The variation in time in the received signal, caused by a delay imposed on the signal before the driver, can vary over a ratio of 1:6 in the example given above. The actual variation is a product of the two bandwidths: the bandwidth of the channel, and the bandwidth of the data. This problem is evident from FIG. 3, where a change from DC to $\frac{1}{8}^{th}$ cycle of a 1 GHz signal, to a 6 GHz signal occurs in rapid succession in a channel with a 1 GHz bandwidth.

The use of transmission codes to improve the received characteristics of the information is well known in the prior art. For example, Manchester and 8 b/10 b encoding is commonly used to ensure there are sufficient transitions present in the bit stream to make clock recovery possible, as in U.S. Pat. Nos. 4,420,234 and 4,486,739. Coding is known also as a means to improve noise immunity of a signal in a communication channel, such as described in U.S. Pat. No. 5,944,842. Other coding methods have been used for many decades to increase the probability of detecting single or multiple bit errors. However, these existing schemes operate within the channel bandwidth, or within the bandwidth that can support baseband transmission and sampling using a relatively fixed sample threshold voltage or current.

BRIEF SUMMARY OF THE INVENTION

The present invention applies a coding to reduce the pattern dependent artifacts within a communication channel, that result from the channel bandwidth being less than the data rate.

It is an object of the present invention to enable channel calibration or perform an adjustment by the introduction of small timing increments and decrements reliably when the data is sampled by a relatively fixed threshold as described in PCT/RU01/00482, PCT/RU01/00365, GB 0131100.0 but the channel bandwidth is insufficient.

Another object of the invention is to increase the maximum amount of data that can be communicated across a channel, in the case where the transmitter and receiver can operate at a frequency well above the bandwidth of the transmission medium but the transform or filter function imposed by the transmission medium distorts the signal such that it cannot be sampled reliably.

It is another object of the invention to reduce the artifacts introduced into the signal from the limited and non-linear characteristics of the channel, such as by reflections not being absorbed efficiently due to the frequency of the reflection being in the non-linear region of the line termination components.

It is still another object of the invention to reduce the offset of the data from the sampling threshold that occurs as a function of the data pattern when the data rate exceeds the bandwidth of the channel.

It is another object of the invention to fold the requirements for a DC balance or for a certain number of signal changes per data word into a single code that achieves these goals simultaneously with improving the data rate.

In accordance with these and other objects, the present invention is a coding means for coding data represented by input symbols into codes for transmitting the codes by a transmitter along a communication channel, the codes being represented in the channel by signals having a limited minimum and maximum pulse width, to enable sampling the coded data at a receiver at each receiver's clock period, wherein the input symbols are encoded to have the minimum signal pulse width longer than one period of the receiver's sampling clock.

Preferably, the input symbols are encoded to have a minimum signal pulse width approximately defined by formula $$P_{min} = \frac{1}{2\tau F},$$

where $\tau$ is a minimum bit interval providing a required bit error rate (BER) of data, the bit interval being a period of time required for the transfer of one bit of information, and F is the bandwidth of the channel. The required bit error rate of data is defined by a specialist in the art taking into account various parameters of a communication channel, such as timing uncertainty of a signal, noise in the channel, metastability in the receiver, etc.

Various approaches known in the field may be used by a specialist in the art to estimate minimal bit interval providing the required BER, which can vary greatly, say, from 1 to 10 values of RMS jitter in the channel. The more strict are requirements to the quality of data transfer, the longer shall be the bit interval. And similarly, the more strict are requirements, the lower is the data rate providing the required BER in the channel. As mentioned above, according to the invention, the input symbols are coded to have the minimum signal pulse width longer than one period of the receiver's sampling clock.

For example, if the bandwidth of the channel is 3 GHz and $\tau$ is 80 picoseconds, $P_{min}$ will amount to $\frac{1}{2} \times 3 \times 10^9 \times 80 \times 10^{-12} \sim 2,08$, thus, for this case, the input symbols will be preferably encoded to have a minimum signal pulse width $P_{min}$ which is at least twice as long as one period of the receiver's sampling clock, or in other terms, the minimal signal pulse width will be equal to 2 bit intervals, as illustrated in FIG. 5.

A coding means can be described by means of a code table wherein each input symbols is assigned one or more, in the present application, two codes, when a DC balance is required. According to the invention, the code table may be created taking into account various constraints selected from maximum and minimum pulse widths (see FIG. 2), a code word width and DC balance requirement of the signal in the channel.

According to a first embodiment of the invention, 8 bit input symbols are encoded into a 13 bit output codes in accordance with the code table provided that, in a sequence of two codes, each bit, except for the first and the last bit of the sequence, must have the same left or right neighbor bit. According to a second embodiment, 8 bit input symbols are encoded into 16 bit output codes in accordance with a code table which is created to produce a DC balanced signal and containing two parts of codes, one part for coding symbols with negative current disparity, and another part for coding symbols with positive current disparity, the table being such that:

each input symbol corresponds to two codes, one code being from the first part of the table and the second code being from the second part;

codes presented in both parts of the table shall be assigned to the same input symbol;

within each code presented in the part of the table for negative current disparity, the sum of "1"s is equal to 8 or 9;

within each code presented in the part of the table for positive current disparity, the sum of "1"s is equal to 7 or 8;

the current disparity is negative when the previous code has 9 or 8 "1"s; and the previous state of disparity was negative, otherwise it is positive;

in any sequence of two codes, one code consisting of 8 "1"s and taken from one part of the table, and another one being any code taken from the same part of the table, each bit of the sequence must have the same left or right neighbor, except for the first and the last bit of the sequence;

in any sequence of two codes, one code consisting of the number of "1"s different from 8 and taken from one part of the table and another code being any one taken from the other part of the table, each bit of the sequence must have the same left or right neighbor, except for the first and the last bit of the sequence;

the two parts of the table contain preferably equal number of codes.

The code table may be reordered to provide the optimal coder implementation such as having minimal logical terms. For example, a modification of the table of the first embodiment gives a fast and elegant means to enable 8 bit input symbols encoding into 13 bit output codes. In this case, the constraints include: minimal pulse width is 2, maximal pulse width is 16, code word width is 13. An implementation of the coder/decoder means for a table corresponding to these requirements can be implemented as presented in Appendix A.

Further improvement of the coder/decoder implementation can be achieved by codes reordering such that: codes are splitted into two groups with 256 codes in one group and 14 codes in the second group, wherein the codes of the first group are nonsymmetrical, while the codes of the second group are symmetrical. The first group of the 256 codes can be splitted into two groups of 128 codes each, such that the center, $6^{th}$, bit is "0", while in the second group the central bit is "1".

Further, for each code of the first group there is a complementary code of the second group. Such a symmetry provides the central bit to be assigned to one of input symbol bits.

Further, each subgroup may be subdivided into two smaller groups each of 64 codes, such that the first group will comprise codes having a number built from bits from 12th to 7th bits is less than the number built from bits from $5^{th}$ to 0 bits.

In each new subgroup, for each code of the first group there is a code of the second group with a reversed bit order. Such a symmetry provides the way to reduce the size of amorphous table and simplify the decoder.

Finally, the codes may be ordered in these small subgroups to simplify the logic functions they describe.

Thus, the coder and decoder may be implemented much more efficiently, as shown in appendices D and E.

In still one more aspect of the invention, a communication apparatus is provided comprising a transmitter, a receiver, and a coding means according to the first aspect of the invention.

According to a preferred example embodiment of the communication apparatus, the coding means produces a code wherein the minimal signal pulse width is equal to 2 bit intervals, while the receiver takes multiple samples during each clock period to track the dynamic variation in the temporal or amplitude thresholds of the data to improve the overall coding efficiency.

To achieve this, a receiver for high speed interconnect may be used as described in GB 0131100.0 filed on 31 Dec. 2002 claiming priority from U.S. 60/317,216 filed on 6 Sep. 2001, the whole description of which application being incorporated herein by reference. The receiver comprises at least one sampler for sampling data, for providing a series of signal copies, each signal copy having a Bit Error Rate Distribution, and a means to combine the signal copies so as to produce a combined signal having the Bit Error Rate Distribution narrower than the distribution of a single signal copy. Further, according to this embodiment, the samples taken by the receiver may be spread in time around a regular sampling clock that enables the dynamic shift in the received data to be tracked by matching shifts in the sampling clock or inverse shifts in delay circuitry within the receiver. A coding means of the invention may be further supplemented by a decoding means to further decode the codes into respective output symbols.

A coding means as well as the decoding means can be implemented in hardware, such as a hub, switch, router, modem or processor, as well as in a logic element synthesised or created based on a table listing of the code alphabet. Alternatively, the coding or decoding means may be implemented in a lookup table.

The code table may be splitted into subtables and an intermediate code may be computed from which the final code is determined.

In another aspect of the invention, a method of coding data represented by input symbols into codes for transmitting along a communication channel is provided using the coding means of the first aspect of the invention.

In still another aspect of the invention, a method of communication including coding data represented by input symbols into codes, transmitting the codes along a communication channel, and receiving data, wherein the data are coded using a method of coding of the present invention.

Further, a method of decoding codes into respective output symbols is provided.

BRIEF DESCRIPTION OF THE SEVERAL VIEWS OF THE DRAWING

For a better understanding of the present invention and the advantages thereof and to show how the same may be carried into effect, reference will now be made, by way of example, without loss of generality, to the following description now taken in conjunction with the accompanying drawings in which.

Figure 1:
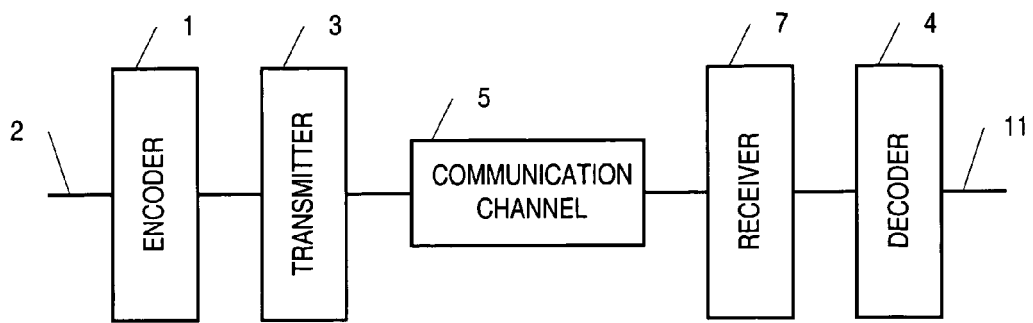
FIG. 1 shows a general block diagram of the communication channel employing the coding means according to the present invention.
Figure 2:
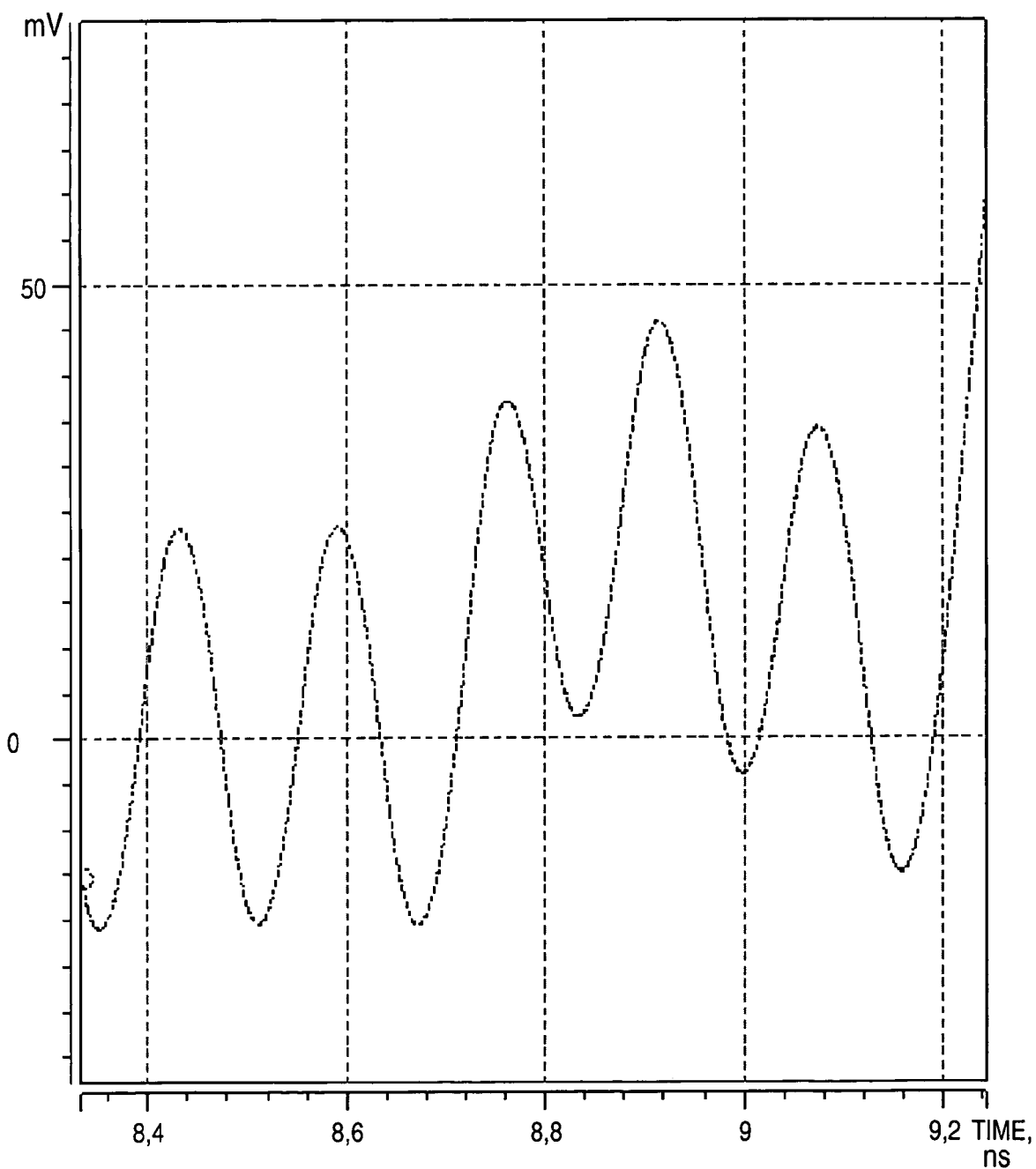
FIG. 2 shows a waveform for a signal received in a 1 GHz BW channel, with a 5 ps time delay introduced into the 6 GHz transmitted signal at the start of the third cycle.
Figure 3:
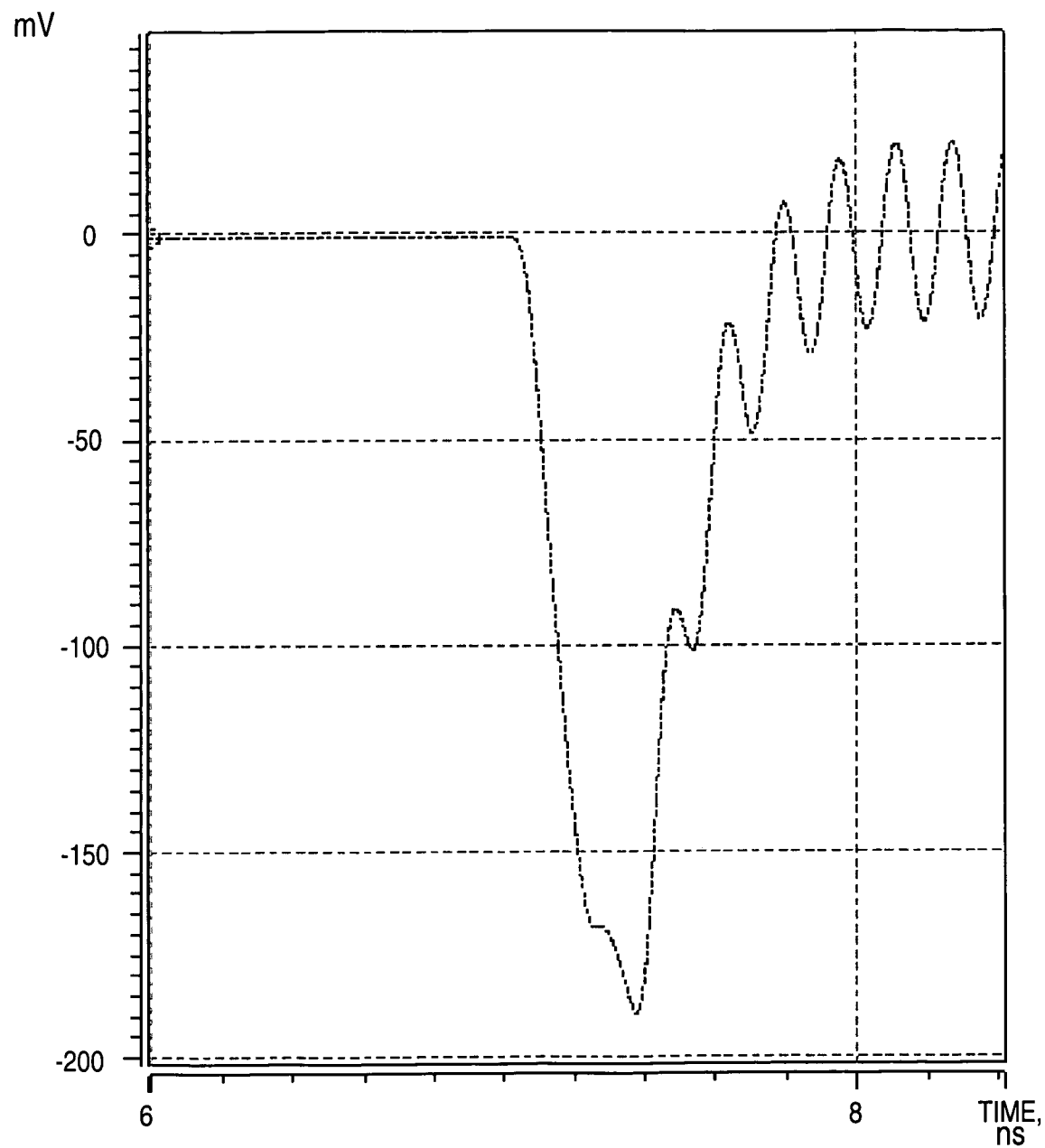
FIG. 3 shows a waveform for a signal received in a 1 GHz BW channel, where the transmitted data has rapid transitions from DC to $\frac{1}{8}^{th}$ cycle of 1 GHz to 6 GHz tone.

Reference will also be made to the following appendices:

Appendix A is a description of a preferred embodiment of FIG. 1 in the Verilog Hardware Description Language, from which actual circuitry can be synthesised using widely used CAD tools such as Ambit from Cadence, and which can be understood easily by a person skilled in the art of modern and high speed VLSI design, including a preferred code table for encoding data of 8 bits in length.

Appendix B is an example of a computer program in the C++ language for generating the code tables or alphabet as required by the present invention.

Appendix C is an alphabet of the code table for a coding scheme as described by the present invention and in which the code is DC balanced for coding an 8 bit data word such that the minimum pulse width is two sample periods, the maximum pulse width is 9 bits and the code is DC balanced.

The code is presented in a table having two parts, the first being a negative disparity table, and the second a positive disparity table. After each word the current disparity is calculated in the same manner as for existing 8 b/10 b coders, such that if the code contains less than half 1s then the disparity after this becomes negative, if it has more 1s than half the code width then the disparity becomes positive. If the number of ones is equal to the number of zeros then disparity remains the same as in the previous cycle. The state of the disparity determines from which part of the table the symbol should be taken. The order of codes can be changed, however, codes presented in both parts of the table should preferably be assigned to the same symbol to simplify decoding.

Appendix D is a description of a preferred embodiment of an 8 bit data word coding into 13 bit codes as described by the present invention, in which the minimum pulse width is two sample periods, the maximum pulse width is 16 bits, code words width is 13. An implementation of the decoder means for this coder is presented in Appendix E.

DETAILED DESCRIPTION OF THE INVENTION

Figure 4:
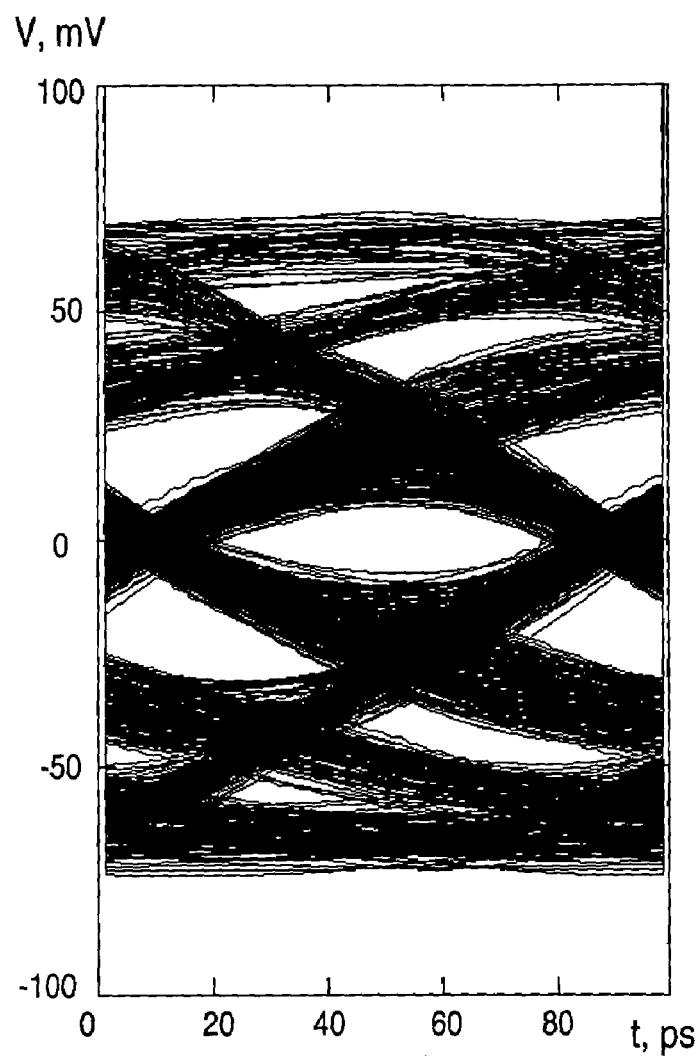
FIG. 4 shows partially an eye diagram for a typical communication channel.
Figure 5:
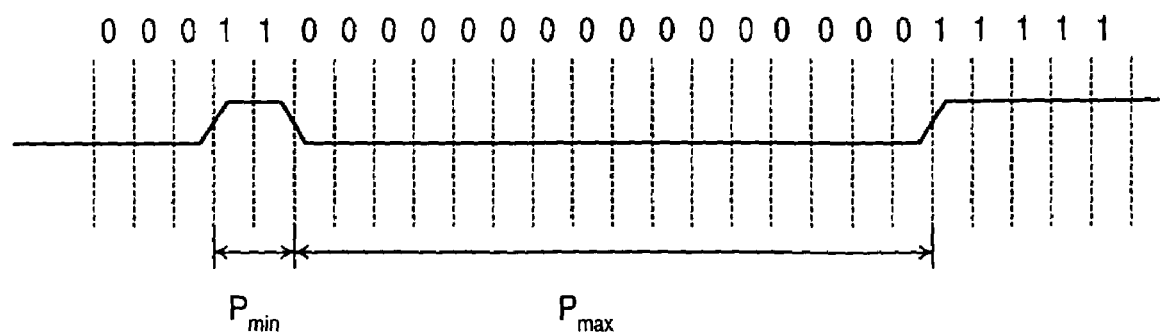
FIG. 5. illustrates values of the minimal and maximal pulse width.

In contemporary communication channels, the data can be viewed in an eye diagram, such as in FIG. 4. In this diagram the data moves from sample point to sample point, with changes in signal polarity at a point equidistant to the centre of the eyes of each sampling point. In the examples given earlier, this amounts to sending 6 GHz of data down a channel with 1 GHz bandwidth (BW).

The present invention reduces the pattern dependent shift of the data in each eye by coding the data to move from eye to eye such that instead of having the opportunity to change polarity between each eye, it must stay in a state for a given number of eyes, such as 2. The number of eyes is not reduced.

A detailed description of the invention will now be given, with reference to FIG. 1 illustrating a communication system in which an input data word 2 is encoded by encoder 1 to have special characteristics as described later, the encoded data is then presented to transmitter 3, sent through communication channel 5 into receiver 7, then decoded in decoder 4 to produce a replica of the original data at output 11. In this system the transmitter and receiver can operate at higher sample or clock rates than the incoming data rate, but that data rate is still well above the bandwidth of channel 5.

The encoder 1 according to the present invention encodes the data 2 to use optimally the sampling rates available in the transmitter and receiver. Hitherto, if data is sent at a rate much higher than the channel bandwidth, for example at 6 times the channel bandwidth, then the impulse function of the channel causes the received signal to be offset and distorted such that it cannot be received reliably using a fixed threshold receiver. The function of the encoding means is to reduce the effect of the impulse or filtering function of the channel.

An example of a suitable encoder is given in Appendix D in the form of a hardware description in the Verilog language, from which a working encoder can be synthesised automatically using widely available CAD tools.

An example of a suitable decoder is given in Appendix E in the form of a hardware description in the Verilog language, from which a working decoder can be synthesised automatically using widely available CAD tools.

The first step in applying the present invention is to determine the requirements of the receiver, in particular, whether the code it requires must be DC balanced or not, and how many bit intervals, or clock cycles, can elapse without the signal changing, that is, the lower frequency limit, or the minimum number of transitions, of the received data. Means for doing this type of coding is well understood and widely used.

The next step, novel to the present invention, is to determine the ratio of the maximum data bandwidth that can be sent through the channel as a continuous repetitive tone, to the maximum data rate that can be supported by the channel given maximum irregularity in the data. For a channel, which can transmit a 6.5 GHz tone, a typical maximum data rate for data containing step changes is 3.25 GHz, a 2:1 ratio. This means that the data must remain constant for two sample periods, i.e. for two bit intervals, whenever it changes. This is distinct and different from simply sending the data at half the data rate: the data even at 3.25 GHz will have encoding, such as 8 b/10 b, so the useful data will be 20% lower than this, or 2.6 GHz of useful data (either 2.6 Gbps or 5.2 Gbps depending on whether the data is clocked on one edge only or on both edges). Moreover, the coding scheme that is described here uses all the eye transition points, so it uses the maximum capacity of the channel given these criteria.

Once the criteria are identified, the algorithm as embodied in the C++ program and the numerous obvious derivatives of this program to cover other code requirements, searches for the minimum code length that meets all the criteria, and then searches for the maximum alphabet for that code length and code constraints.

For example, consider a channel where the minimum signal pulse width is two sample periods, or two bit intervals, and the minimum number of transitions of the signal is one per 16 bits.

The program in Appendix B can be used to find the code table, as reproduced in Appendix A. This particular table is preferred because it is the smallest table meeting these two requirements. This takes 8 bits of incoming data and expands it to 13 bits, which can be transmitted reliably through the 1 GHz BW channel under the conditions described above, namely where the receiver, channel compensation and calibration enables 3.25 GHz to be transmitted. In this case, if the data is clocked on both edges, then the data capacity without coding is 7 Gbps, which is 5.6 Gbps of useful data assuming that 8 b/10 b coding is used in the original channel. If the same data is applied to the 8 b/13 b coding scheme in Appendix A, then 8 Gbps of real data is transmitted, a 43% increase in the real data conveyed by the channel.

If the requirement is added that the code be DC balanced, then the minimum code is probably that shown in Appendix C, which is a 8 b/16 b code, namely 8 bits of real data is expanded to be 16 bits. This code is used by selecting 256 of the letters or entries to act as a 8 b/16 b code, using parity and disparity to select sequential code tables for sequential words in the same way as an 8 b/10 b coder. The 8 b/16 b alphabet is 319 code words in length. In this case, compared to the channel which transmitted 7 Gbps using 8 b/10 b encoding, the channel with 8 b/16 b coding can now send 6.5 Gbps of real data instead of 5.6 Gbps, an increase of 16%. In computing the code alphabets, the number of codes must be greater than two raised to the power of the number of bits to be sent in the original data word. In the case of the 8 b/13 b coding scheme, there are 269 codes in the alphabet, which is more than 256. The FIG. 256 is the two raised to the power of data word size, 8 bits. The code has a maximum interval between transitions of 9 bits.

Where the maximum interval between clock changes is increased, the efficiency of the coding system also increases. For example, if a clock transition is only required every 1024, then the number of codes rejected is a much smaller proportion to the possible alphabet than in the case with small words. This increases the maximum data rate even further.

It can be seen clearly from the two example code tables, that increasing the number of constraints or requirements for the code reduces its efficiency. Three bits are lost in an 8 bit coding scheme simply by adding the requirement that the code is DC balanced. A preferred embodiment thus minimises the number of constraints applied to the code word, except that the code word shall have a minimum pulse width which is more than one clock period.

A method for increasing the interval between clock changes is to apply the sampling scheme as described in U.S. 60/317,216 of Jun. 9, 2001 by the present inventors, in which a plurality of samples are made and the difference across these samples is used to track the data. The means to track the voltage and time threshold of the received data, in essence by taking a number of samples and then determining which sample is the centre of the sampling eye, can be used to greatly increase the interval in which no transitions are required. In an advanced preferred embodiment of the present invention, these two techniques are combined to create longer code words, thus greater coding efficiency, and enable these long code words to operate reliably.

An alternative to computing the code in a single table lookup, or logic synthesised from the description of such tables, is to split the table into sections, such as in two sections and to compute logic value, such as a disparity value, and use this value to generate the final code in conjunction with the intermediate results from the smaller tables.

Where the code table is computed such as by using a program such as that in Appendix B, but the length of the alphabet is short of the required length, the list of rejected codes can be re-examined to determine if sufficient increase in the alphabet length can be achieved by linking two code words. That is, an alphabet is used to generate the first code word, then a flag or carry value is used to index a further code table such that the code applied to the subsequent data word is from a different alphabet to that used to encode the first word.

Once the code table has been generated, it is preferred to validate the table by running all possible variations of two adjacent input data words through the coder, through an extreme worst case HSPICE model of the driver, package with parasitics, pcb, any connectors including the via or connect hole model in the pcb, receiver package with parasitics, receiver ESD structure and receiver buffer, and then into the decoder. The encoder and decoder in this validation process is implemented preferably in a HDL, such as using the Verilog or VHDL languages, and confirm that the entire table meets the required objectives. This has been done for the code tables published here.

It is possible to use the above validation process to extend the length of an alphabet, by accepting code words that can validate but do not meet the design criteria. This is a method of generating the alphabet but is not preferred because variations in parasitics in the channel, and channel noise, can cause irregular and non-linear behaviour which will affect such alphabets very much more adversely than for alphabets which are developed using a program such as shown in Appendix B that are correct by construction.

Whilst the example embodiments have focused on a coder, it is obvious from their description and the Appendices, that the decoder is simply the inverse operation and the construction of this decoder, once the coder has been defined, is evident to anyone skilled in the art of digital system design.

The present invention solves a particular problem in a communication system where the transmitter and receiver can operate reliably at frequencies well above the bandwidth of the channel. The design of such systems is very complex and highly specialised, requiring the solution of a multitude of problems. Once that design solution is in place, the present invention allocates part of the performance of the transmitter and receiver to codes which apply some of the bandwidth of the transmitted data for overcoming bandwidth deficiencies in the channel medium and interconnect. The present invention thus reduces the total number of real data bits that are received, compared with a channel which simply sends the data and samples it at the receiver. However, given that a transmitter and receiver with the required performance can be designed an implemented as is now the case with contemporary activities, the present invention allows more real data to be communicated in the case where the sampling rate exceeds the channel bandwidth by a multiple of two or more.

Appendix A

Hardware Description in the Verilog language of a coder for coding data with the minimum pulse width of 2 sample periods and a maximum period between transitions of 16 sample periods.

```
module coder_8B13B(
            clock,          // clock
            reset,          // power up reset
            din,            // Data in
            cin,            // Command in
            out);           // data output input           clock;
    input           reset;      // system reset. Active high
    input   [7:0]   din;        // {H,G,F,E,D,C,B,A}
    input           cin;        // 1 - Command, 0 - data
    output  [12:0]  out;        // {m,l,k,j,h,g,f,i,e,d,c,b,a}

//----------------------
// internal signals:
//---------------------- reg     [12:0]  d;

//----------------------
// code:
//---------------------- always @(posedge clock or posedge reset) if (reset) begin
        d <= 13'b0000001100011;   // code for data 0
    end
    else    begin
        if (cin) begin                    // Commands encoding
            case ({din[7:0]})
                8'h1C : begin d <= 13'b0011100000000; end
                8'h3C : begin d <= 13'b1111110011111; end
                8'h5C : begin d <= 13'b1100011111111; end
                8'h7C : begin d <= 13'b1111111000000; end
                8'h9C : begin d <= 13'b1110011111111; end
                8'hBC : begin d <= 13'b1111111000011; end
                8'hDC : begin d <= 13'b1111100000000; end
                8'hFC : begin d <= 13'b1111111000111; end
                8'hF7 : begin d <= 13'b1111111001111; end
                8'hFB : begin d <= 13'b1111111001100; end
                8'hFD : begin d <= 13'b1111111100000; end
                8'hFE : begin d <= 13'b1111111100011; end
                8'hFF : begin d <= 13'b1111111100111; end
                                    // command FF by default
```

```
        default : begin d <= 13'b1111111100111; end
      endcase
    end
    else begin                              // data encoding
      case (({din[7:0]})
        8'h00 : begin d <= 13'b0000001100011; end
        8'h01 : begin d <= 13'b0000001100111; end
        8'h02 : begin d <= 13'b0000001110000; end
        8'h03 : begin d <= 13'b0000001110011; end
        8'h04 : begin d <= 13'b0000001111000; end
        8'h05 : begin d <= 13'b0000001111100; end
        8'h06 : begin d <= 13'b0000011000000; end
        8'h07 : begin d <= 13'b0000011000011; end
        8'h08 : begin d <= 13'b0000011000111; end
        8'h09 : begin d <= 13'b0000011001100; end
        8'h0A : begin d <= 13'b0000011001111; end
        8'h0B : begin d <= 13'b0000011100000; end
        8'h0C : begin d <= 13'b0000011100011; end
        8'h0D : begin d <= 13'b0000011100111; end
        8'h0E : begin d <= 13'b0000011110000; end
        8'h0F : begin d <= 13'b0000011110011; end
        8'h10 : begin d <= 13'b0000011111000; end
        8'h11 : begin d <= 13'b0000011111100; end
        8'h12 : begin d <= 13'b0000110000011; end
        8'h13 : begin d <= 13'b0000110000111; end
        8'h14 : begin d <= 13'b0000110001100; end
        8'h15 : begin d <= 13'b0000110001111; end
        8'h16 : begin d <= 13'b0000110011000; end
        8'h17 : begin d <= 13'b0000110011100; end
        8'h18 : begin d <= 13'b0000110011111; end
        8'h19 : begin d <= 13'b0000111000000; end
        8'h1A : begin d <= 13'b0000111000011; end
        8'h1B : begin d <= 13'b0000111000111; end
        8'h1C : begin d <= 13'b0000111001100; end
        8'h1D : begin d <= 13'b0000111001111; end
        8'h1E : begin d <= 13'b0000111100000; end
        8'h1F : begin d <= 13'b0000111100011; end
        8'h20 : begin d <= 13'b0000111100111; end
        8'h21 : begin d <= 13'b0000111110000; end
        8'h22 : begin d <= 13'b0000111110011; end
        8'h23 : begin d <= 13'b0000111111000; end
        8'h24 : begin d <= 13'b0000111111100; end
        8'h25 : begin d <= 13'b0001100000011; end
        8'h26 : begin d <= 13'b0001100000111; end
        8'h27 : begin d <= 13'b0001100001100; end
        8'h28 : begin d <= 13'b0001100001111; end
        8'h29 : begin d <= 13'b0001100011000; end
        8'h2A : begin d <= 13'b0001100011100; end
        8'h2B : begin d <= 13'b0001100011111; end
        8'h2C : begin d <= 13'b0001100110000; end
        8'h2D : begin d <= 13'b0001100110011; end
```

```
8'h2E : begin d <= 13'b0001100111000; end
8'h2F : begin d <= 13'b0001100111100; end
8'h30 : begin d <= 13'b0001100111111; end
8'h31 : begin d <= 13'b0001110000011; end
8'h32 : begin d <= 13'b0001110000111; end
8'h33 : begin d <= 13'b0001110001100; end
8'h34 : begin d <= 13'b0001110001111; end
8'h35 : begin d <= 13'b0001110011000; end
8'h36 : begin d <= 13'b0001110011100; end
8'h37 : begin d <= 13'b0001110011111; end
8'h38 : begin d <= 13'b0001111000000; end
8'h39 : begin d <= 13'b0001111000011; end
8'h3A : begin d <= 13'b0001111000111; end
8'h3B : begin d <= 13'b0001111001100; end
8'h3C : begin d <= 13'b0001111001111; end
8'h3D : begin d <= 13'b0001111100000; end
8'h3E : begin d <= 13'b0001111100011; end
8'h3F : begin d <= 13'b0001111100111; end
8'h40 : begin d <= 13'b0001111110000; end
8'h41 : begin d <= 13'b0001111110011; end
8'h42 : begin d <= 13'b0001111111000; end
8'h43 : begin d <= 13'b0001111111100; end
8'h44 : begin d <= 13'b0011000000011; end
8'h45 : begin d <= 13'b0011000000111; end
8'h46 : begin d <= 13'b0011000001100; end
8'h47 : begin d <= 13'b0011000001111; end
8'h48 : begin d <= 13'b0011000011000; end
8'h49 : begin d <= 13'b0011000011100; end
8'h4A : begin d <= 13'b0011000011111; end
8'h4B : begin d <= 13'b0011000110000; end
8'h4C : begin d <= 13'b0011000110011; end
8'h4D : begin d <= 13'b0011000111000; end
8'h4E : begin d <= 13'b0011000111100; end
8'h4F : begin d <= 13'b0011000111111; end
8'h50 : begin d <= 13'b0011001100000; end
8'h51 : begin d <= 13'b0011001100011; end
8'h52 : begin d <= 13'b0011001100111; end
8'h53 : begin d <= 13'b0011001110000; end
8'h54 : begin d <= 13'b0011001110011; end
8'h55 : begin d <= 13'b0011001111000; end
8'h56 : begin d <= 13'b0011001111100; end
8'h57 : begin d <= 13'b0011100000011; end
8'h58 : begin d <= 13'b0011100000111; end
8'h59 : begin d <= 13'b0011100001100; end
8'h5A : begin d <= 13'b0011100001111; end
8'h5B : begin d <= 13'b0011100011000; end
8'h5C : begin d <= 13'b0011100011100; end
8'h5D : begin d <= 13'b0011100011111; end
8'h5E : begin d <= 13'b0011100110000; end
8'h5F : begin d <= 13'b0011100110011; end
8'h60 : begin d <= 13'b0011100111000; end
```

```
8'h61 : begin d <= 13'b0011100111100; end
8'h62 : begin d <= 13'b0011100111111; end
8'h63 : begin d <= 13'b0011110000011; end
8'h64 : begin d <= 13'b0011110000111; end
8'h65 : begin d <= 13'b0011110001100; end
8'h66 : begin d <= 13'b0011110001111; end
8'h67 : begin d <= 13'b0011110011000; end
8'h68 : begin d <= 13'b0011110011100; end
8'h69 : begin d <= 13'b0011110011111; end
8'h6A : begin d <= 13'b0011111000000; end
8'h6B : begin d <= 13'b0011111000011; end
8'h6C : begin d <= 13'b0011111000111; end
8'h6D : begin d <= 13'b0011111001100; end
8'h6E : begin d <= 13'b0011111001111; end
8'h6F : begin d <= 13'b0011111100000; end
8'h70 : begin d <= 13'b0011111100011; end
8'h71 : begin d <= 13'b0011111100111; end
8'h72 : begin d <= 13'b0011111110000; end
8'h73 : begin d <= 13'b0011111110011; end
8'h74 : begin d <= 13'b0011111111000; end
8'h75 : begin d <= 13'b0011111111100; end
8'h76 : begin d <= 13'b1100000000011; end
8'h77 : begin d <= 13'b1100000000111; end
8'h78 : begin d <= 13'b1100000001100; end
8'h79 : begin d <= 13'b1100000001111; end
8'h7A : begin d <= 13'b1100000011000; end
8'h7B : begin d <= 13'b1100000011100; end
8'h7C : begin d <= 13'b1100000011111; end
8'h7D : begin d <= 13'b1100000110000; end
8'h7E : begin d <= 13'b1100000110011; end
8'h7F : begin d <= 13'b1100000111000; end
8'h80 : begin d <= 13'b1100000111100; end
8'h81 : begin d <= 13'b1100000111111; end
8'h82 : begin d <= 13'b1100001100000; end
8'h83 : begin d <= 13'b1100001100011; end
8'h84 : begin d <= 13'b1100001100111; end
8'h85 : begin d <= 13'b1100001110000; end
8'h86 : begin d <= 13'b1100001110011; end
8'h87 : begin d <= 13'b1100001111000; end
8'h88 : begin d <= 13'b1100001111100; end
8'h89 : begin d <= 13'b1100011000000; end
8'h8A : begin d <= 13'b1100011000011; end
8'h8B : begin d <= 13'b1100011000111; end
8'h8C : begin d <= 13'b1100011001100; end
8'h8D : begin d <= 13'b1100011001111; end
8'h8E : begin d <= 13'b1100011100000; end
8'h8F : begin d <= 13'b1100011100011; end
8'h90 : begin d <= 13'b1100011100111; end
8'h91 : begin d <= 13'b1100011110000; end
8'h92 : begin d <= 13'b1100011110011; end
8'h93 : begin d <= 13'b1100011111000; end
```

```
8'h94 : begin d <= 13'b1100011111100; end
8'h95 : begin d <= 13'b1100110000011; end
8'h96 : begin d <= 13'b1100110000111; end
8'h97 : begin d <= 13'b1100110001100; end
8'h98 : begin d <= 13'b1100110001111; end
8'h99 : begin d <= 13'b1100110011000; end
8'h9A : begin d <= 13'b1100110011100; end
8'h9B : begin d <= 13'b1100110011111; end
8'h9C : begin d <= 13'b1100111000000; end
8'h9D : begin d <= 13'b1100111000011; end
8'h9E : begin d <= 13'b1100111000111; end
8'h9F : begin d <= 13'b1100111001100; end
8'hA0 : begin d <= 13'b1100111001111; end
8'hA1 : begin d <= 13'b1100111100000; end
8'hA2 : begin d <= 13'b1100111100011; end
8'hA3 : begin d <= 13'b1100111100111; end
8'hA4 : begin d <= 13'b1100111110000; end
8'hA5 : begin d <= 13'b1100111110011; end
8'hA6 : begin d <= 13'b1100111111000; end
8'hA7 : begin d <= 13'b1100111111100; end
8'hA8 : begin d <= 13'b1110000000011; end
8'hA9 : begin d <= 13'b1110000000111; end
8'hAA : begin d <= 13'b1110000001100; end
8'hAB : begin d <= 13'b1110000001111; end
8'hAC : begin d <= 13'b1110000011000; end
8'hAD : begin d <= 13'b1110000011100; end
8'hAE : begin d <= 13'b1110000011111; end
8'hAF : begin d <= 13'b1110000110000; end
8'hB0 : begin d <= 13'b1110000110011; end
8'hB1 : begin d <= 13'b1110000111000; end
8'hB2 : begin d <= 13'b1110000111100; end
8'hB3 : begin d <= 13'b1110000111111; end
8'hB4 : begin d <= 13'b1110001100000; end
8'hB5 : begin d <= 13'b1110001100011; end
8'hB6 : begin d <= 13'b1110001100111; end
8'hB7 : begin d <= 13'b1110001110000; end
8'hB8 : begin d <= 13'b1110001110011; end
8'hB9 : begin d <= 13'b1110001111000; end
8'hBA : begin d <= 13'b1110001111100; end
8'hBB : begin d <= 13'b1110011000000; end
8'hBC : begin d <= 13'b1110011000011; end
8'hBD : begin d <= 13'b1110011000111; end
8'hBE : begin d <= 13'b1110011001100; end
8'hBF : begin d <= 13'b1110011001111; end
8'hC0 : begin d <= 13'b1110011100000; end
8'hC1 : begin d <= 13'b1110011100011; end
8'hC2 : begin d <= 13'b1110011100111; end
8'hC3 : begin d <= 13'b1110011110000; end
8'hC4 : begin d <= 13'b1110011110011; end
8'hC5 : begin d <= 13'b1110011111000; end
8'hC6 : begin d <= 13'b1110011111100; end
```

```
8'hC7 : begin d <= 13'b1111000000011; end
8'hC8 : begin d <= 13'b1111000000111; end
8'hC9 : begin d <= 13'b1111000001100; end
8'hCA : begin d <= 13'b1111000001111; end
8'hCB : begin d <= 13'b1111000011000; end
8'hCC : begin d <= 13'b1111000011100; end
8'hCD : begin d <= 13'b1111000011111; end
8'hCE : begin d <= 13'b1111000110000; end
8'hCF : begin d <= 13'b1111000110011; end
8'hD0 : begin d <= 13'b1111000111000; end
8'hD1 : begin d <= 13'b1111000111100; end
8'hD2 : begin d <= 13'b1111000111111; end
8'hD3 : begin d <= 13'b1111001100000; end
8'hD4 : begin d <= 13'b1111001100011; end
8'hD5 : begin d <= 13'b1111001100111; end
8'hD6 : begin d <= 13'b1111001110000; end
8'hD7 : begin d <= 13'b1111001110011; end
8'hD8 : begin d <= 13'b1111001111000; end
8'hD9 : begin d <= 13'b1111001111100; end
8'hDA : begin d <= 13'b0000000110000; end
8'hDB : begin d <= 13'b1111100000011; end
8'hDC : begin d <= 13'b0000000110011; end
8'hDD : begin d <= 13'b1111100000111; end
8'hDE : begin d <= 13'b0000000111000; end
8'hDF : begin d <= 13'b1111100001100; end
8'hE0 : begin d <= 13'b0000000111100; end
8'hE1 : begin d <= 13'b1111100001111; end
8'hE2 : begin d <= 13'b0000000111111; end
8'hE3 : begin d <= 13'b1111100011000; end
8'hE4 : begin d <= 13'b0000001111111; end
8'hE5 : begin d <= 13'b1111100011100; end
8'hE6 : begin d <= 13'b0000110000000; end
8'hE7 : begin d <= 13'b1111100011111; end
8'hE8 : begin d <= 13'b0001110000000; end
8'hE9 : begin d <= 13'b1111100110000; end
8'hEA : begin d <= 13'b0011001111111; end
8'hEB : begin d <= 13'b1111100110011; end
8'hEC : begin d <= 13'b0011110000000; end
8'hED : begin d <= 13'b1111100111000; end
8'hEE : begin d <= 13'b1100001111111; end
8'hEF : begin d <= 13'b1111100111100; end
8'hF0 : begin d <= 13'b1100110000000; end
8'hF1 : begin d <= 13'b1111100111111; end
8'hF2 : begin d <= 13'b1110001111111; end
8'hF3 : begin d <= 13'b1111001111111; end
8'hF4 : begin d <= 13'b1111110000000; end
8'hF5 : begin d <= 13'b1111110000011; end
8'hF6 : begin d <= 13'b0000000011000; end
8'hF7 : begin d <= 13'b1111110000111; end
8'hF8 : begin d <= 13'b0000000011100; end
8'hF9 : begin d <= 13'b1111110001100; end
```

```
                8'hFA : begin d <= 13'b0000000011111; end
                8'hFB : begin d <= 13'b1111110001111; end
                8'hFC : begin d <= 13'b0000011111111; end
                8'hFD : begin d <= 13'b1111110011000; end
                8'hFE : begin d <= 13'b0001100000000; end
                8'hFF : begin d <= 13'b1111110011100; end
              default : begin end
            endcase
        end
    end assign out[0]  = d[12]; // correct order: MSB is "m", LSB is "a" (going output first)
    assign out[1]  = d[11];
    assign out[2]  = d[10];
    assign out[3]  = d[9];
    assign out[4]  = d[8];
    assign out[5]  = d[7];
    assign out[6]  = d[6];
    assign out[7]  = d[5];
    assign out[8]  = d[4];
    assign out[9]  = d[3];
    assign out[10] = d[2];
    assign out[11] = d[1];
    assign out[12] = d[0];

endmodule
```

Appendix B
Example C++ Program for determining a valid code table

```
/*
This program finds codes for determined code length, minimum and maximum number of repeatative bits.
       usage:    cf    Number_of_bits_in_code    Minimum_pulse_width_in_bits Maximum_pulse_width_in_bits Output_file_name
*/ include    <stdio.h>
include    <string.h>
#include    <math.h>
#include    <stdlib.h>

// maximum number of chars in text string
#define MAXL 256

// maximum code length
#define MAXLENGTH 16

// maximum codes on the output
#define MAXCODES 2048

// enable extra sorting
define EXTRA_SORT_EN 0 int     length, min, max;
int     min_bits, max_bits, mid_en;
int     nc;
int     c[MAXCODES];

int     dsm[MAXCODES];
int     dsp[MAXCODES];
int     cntm, cntp;

int     rm[MAXCODES];
int     rp[MAXCODES];
int     cntrm, cntrp;

int     wt[MAXCODES];
int     depth;
int     presc, iter;

char    weight[2<<(MAXLENGTH-1)];
```

```
int         cmp[MAXCODES][MAXCODES];

char        *ofile_name;

int         start, end, top_en, dc_bal_en;
int         sm[MAXCODES];
int         sp[MAXCODES];
int         smc, spc;
int         minm, minp;

FILE        *ofile;

void sec(n)

int     n;

{
        int     i, j, k, l;
        do {
                k=0;
                minm=cntp;
                minp=cntm;
                for(i=0; i<cntm; i++) {
                        l=0;
                        for(j=0; j<cntp; j++) l+=cmp[dsm[i]][dsp[j]] & cmp[dsp[j]][dsm[i]];
                        if(l<n) {
                                k++;
                                sm[smc++]=dsm[i];
                                cntm--;
                                for(j=i; j<cntm; j++) dsm[j]=dsm[j+1];
                        }
                        else minm=min(minm,l);
                }
                for(i=0; i<cntp; i++) {
                        l=0;
                        for(j=0; j<cntm; j++) l+=cmp[dsm[j]][dsp[i]] & cmp[dsp[i]][dsm[j]];
                        if(l<n) {
                                k++;
                                sp[spc++]=dsp[i];
                                cntp--;
                                for(j=i; j<cntp; j++) dsp[j]=dsp[j+1];
                        }
                        else minp=min(minp,l);
                }
                if(dc_bal_en!=0) {
```

```
                                for(i=0; i<cntm; i++) {
                                    if(weight[dsm[i]]==mid_en) {
                                        l=0;
                                        for(j=0;  j<cntm;  j++)  l+=cmp[dsm[i]][dsm[j]]  &
    cmp[dsm[j]][dsm[i]];
                                        if(l<n) {
                                            k++;
                                            sm[smc++]=dsm[i];
                                            cntm--;
                                            for(j=i; j<cntm; j++) dsm[j]=dsm[j+1];
                                        }
                                        else minm=min(minm,l);
                                    }
                                }
                                for(i=0; i<cntp; i++) {
                                    if(weight[dsp[i]]==mid_en) {
                                        l=0;
                                        for(j=0;   j<cntp;   j++)   l+=cmp[dsp[j]][dsp[i]]   &
    cmp[dsp[i]][dsp[j]];
                                        if(l<n) {
                                            k++;
                                            sp[spc++]=dsp[i];
                                            cntp--;
                                            for(j=i; j<cntp; j++) dsp[j]=dsp[j+1];
                                        }
                                        else minp=min(minp,l);
                                    }
                                }
                            }
                    } while(k!=0);
            } void sort(void)
            {
                int         i, j, k, l, m, repm, repp, lm, lp, wi, wm, wp, wb;
                double      wc;
                int         conm[MAXCODES];
                int         conp[MAXCODES];

for(i=0; i<cntp; i++) {
                    conp[i]=0;
                    for(j=0; j<cntm; j++) {
                        conp[i]+=((cmp[dsm[j]][dsp[i]]==0)||(cmp[dsp[i]][dsm[j]]==0))?1:0;
                    }
```

```
            }
        for(i=0; i<cntm; i++) {
            conm[i]=0;
            for(j=0; j<cntp; j++) {
                conm[i]+=((cmp[dsm[i]][dsp[j]]==0)||(cmp[dsp[j]][dsm[i]]==0))?1:0;
            }
        } for(i=0; i<cntp; i++) {
            for(j=0; j<i; j++) {
                if(conp[j]>conp[j+1]) {
                    k=conp[j];
                    conp[j]=conp[j+1];
                    conp[j+1]=k;
                    k=dsp[j];
                    dsp[j]=dsp[j+1];
                    dsp[j+1]=k;
                }
            }
        } for(i=0; i<cntm; i++) {
            for(j=0; j<i; j++) {
                if(conm[j]>conm[j+1]) {
                    k=conm[j];
                    conm[j]=conm[j+1];
                    conm[j+1]=k;
                    k=dsm[j];
                    dsm[j]=dsm[j+1];
                    dsm[j+1]=k;
                }
            }
        } if(EXTRA_SORT_EN!=0) {
            wc=0.;
            for(i=0; i<cntm; i++) {
                k=(cntm-i)*(cntm-i);
                for(j=0; j<cntp; j++) wc+=((cntp-j)*(cntp-j)+k)*(1-(cmp[dsm[i]][dsp[j]]&cmp[dsp[j]][dsm[i]]));
                if(wt[dsm[i]]==mid_en) for(j=0; j<cntm; j++) wc+=(cntm-j)*(cntm-j)*(1-(cmp[dsm[i]][dsm[j]]&cmp[dsm[j]][dsm[i]]));
            }
```

```
for(i=0; i<cntm; i++) {
    printf("Sorting iteration %d%%, current weight is %d\r",(i*100)/cntm,wc);
    exit(0);
    for(j=0; j<cntp; j++) {
        for(k=0; k<cntm; k++) {
            for(l=0; l<cntp; l++) {
                // try to swap row,col i,j, with k,l. if total weight is less then leave it.
                // count difference of swapping m
                wm=0;
                for(m=0; m<cntp; m++) wm+=((cntp-m)*(cntp-m)+k)*(1-(cmp[dsm[i]][dsp[j]]&cmp[dsp[j]][dsm[i]]));
            }
        }
    }
    printf("\n");
}
lm=0;
lp=0;
for(i=0; i<max(cntm,cntp); i++) {
    if(i<cntm) {
        repp=0;
        for(j=0; j<min(cntp,i+1); j++) {
            if((cmp[dsm[i]][dsp[j]]==0)||(cmp[dsp[j]][dsm[i]]==0)) {
                for(k=lp+1; k<cntp; k++) {
                    repp=0;
                    for(l=0; l<=i; l++) {
                        if((cmp[dsm[l]][dsp[k]]==0)||(cmp[dsp[k]][dsm[l]]==0)) {
                            repp=1;
                            break;
                        }
                    }
                    if(repp==0) {
                        l=dsp[k];
                        for(; k>j; k--) dsp[k]=dsp[k-1];
                        dsp[j]=l;
                        break;
                    }
                }
            }
        }
        if(repp!=0) break;
```

28

```
                }
                if(repp==0) lp++;
        }
        if(i<cntp) {
                repm=0;
                for(j=0; j<min(cntm,i+1); j++) {
                        if((cmp[dsm[j]][dsp[i]]==0)||(cmp[dsp[i]][dsm[j]]==0)) {
                                for(k=lm+1; k<cntm; k++) {
                                        repm=0;
                                        for(l=0; l<=i; l++) {
                                                if((cmp[dsm[k]][dsp[l]]==0)||(cmp[dsp[l]][dsm[k]]==0)) {
                                                        repm=1;
                                                        break;
                                                }
                                        }
                                        if(repm==0) {
                                                l=dsm[k];
                                                for(; k>j; k--) dsm[k]=dsm[k-1];
                                                dsm[j]=l;
                                                break;
                                        }
                                }
                        }
                        if(repm!=0) break;
                }
                if(repm==0) lm++;
        }
        if((repp!=0)&&(repm!=0)) break;
}
printf("lm=%d lp=%d\n",lm,lp);
}
// dump results void dump(void)
{
        int     i, j;

if ((ofile=fopen(ofile_name, "w"))==NULL){
                printf("Can't open \"%s\" for write\n", ofile_name);
                exit(1);
        }
```

```
        fprintf(ofile,"-\n");
        for(i=1; i<cntm; i++) {
                for(j=length-1; j>=0; j--) {
                        fprintf(ofile,"%d",(c[dsm[i]]>>j)&1);
                }
                fprintf(ofile,"\n");
        } fprintf(ofile,"+\n");
        for(i=1; i<cntp; i++) {
                for(j=length-1; j>=0; j--) {
                        fprintf(ofile,"%d",(c[dsp[i]]>>j)&1);
                }
                fprintf(ofile,"\n");
        } fprintf(ofile,"removed -\n");
        for(i=0; i<cntrm; i++) {
                for(j=length-1; j>=0; j--) {
                        fprintf(ofile,"%d",(c[rm[i]]>>j)&1);
                }
                fprintf(ofile,"\n");
        } fprintf(ofile,"removed +\n");
        for(i=0; i<cntrp; i++) {
                for(j=length-1; j>=0; j--) {
                        fprintf(ofile,"%d",(c[rp[i]]>>j)&1);
                }
                fprintf(ofile,"\n");
        } fclose(ofile);
}

// remove one code and try to test for conflicts, if failed try to remove another and test again. Recursive!!!

int r(f, s, type)
        int     f, s, type;
{
        int     i, j;
```

```
//      printf("r(f=%d s=%d, type=%d) at level %d\n",f,s,type,cntrm+cntrp);

if(type==0) {
                if(wt[dsm[f]]==mid_en) {
                        cntm--;

rm[cntrm++]=dsm[f];
                        for(i=f; i<cntm; i++) dsm[i]=dsm[i+1];
                        j=test();
                        if(j>0) return(j);
                        for(i=cntm; i>f; i--) dsm[i]=dsm[i-1];
                        dsm[f]=rm[--cntrm];

rm[cntrm++]=dsm[s];
                        for(i=s; i<cntm; i++) dsm[i]=dsm[i+1];
                        j=test();
                        if(j>0) return(j);
                        for(i=cntm; i>s; i--) dsm[i]=dsm[i-1];
                        dsm[s]=rm[--cntrm];

cntm++;
                }
                else if(cntm>cntp) {
                        cntm--;

rm[cntrm++]=dsm[f];
                        for(i=f; i<cntm; i++) dsm[i]=dsm[i+1];
                        j=test();
                        if(j>0) return(j);
                        for(i=cntm; i>f; i--) dsm[i]=dsm[i-1];
                        dsm[f]=rm[--cntrm];

cntm++;
                } if(cntp>depth) {
                        cntp--;

rp[cntrp++]=dsp[s];
                        for(i=s; i<cntp; i++) dsp[i]=dsp[i+1];
                        j=test();
                        if(j>0) return(j);
                        for(i=cntp; i>s; i--) dsp[i]=dsp[i-1];
                        dsp[s]=rp[--cntrp];

cntp++;
```

```
                    }
                }
                else {
                    cntp--;

rp[cntrp++]=dsp[s];
                    for(i=s; i<cntp; i++) dsp[i]=dsp[i+1];
                    j=test();
                    if(j>0) return(j);
                    for(i=cntp; i>s; i--) dsp[i]=dsp[i-1];
                    dsp[s]=rp[--cntrp];

cntp++;

if(cntm>depth) {
                        cntm--;

rm[cntrm++]=dsm[f];
                        for(i=f; i<cntm; i++) dsm[i]=dsm[i+1];
                        j=test();
                        if(j>0) return(j);
                        for(i=cntm; i>f; i--) dsm[i]=dsm[i-1];
                        dsm[f]=rm[--cntrm];

cntm++;
                    }
                }
            }
            else {
                if(wt[dsp[f]]==mid_en) {
//                    printf("here ------------------------------------\n");
                    cntp--;

rp[cntrp++]=dsp[f];
                    for(i=f; i<cntp; i++) dsp[i]=dsp[i+1];
                    j=test();
                    if(j>0) return(j);
                    for(i=cntp; i>f; i--) dsp[i]=dsp[i-1];
                    dsp[f]=rp[--cntrp];

rp[cntrp++]=dsp[s];
                    for(i=s; i<cntp; i++) dsp[i]=dsp[i+1];
                    j=test();
                    if(j>0) return(j);
                    for(i=cntp; i>s; i--) dsp[i]=dsp[i-1];
```

32

```
                    dsp[s]=rp[--cntrp];

cntp++;
            }
            else if(cntm>cntp) {
                    cntm--;

rm[cntrm++]=dsm[s];
                    for(i=s; i<cntm; i++) dsm[i]=dsm[i+1];
                    j=test();
                    if(j>0) return(j);
                    for(i=cntm; i>s; i--) dsm[i]=dsm[i-1];
                    dsm[s]=rm[--cntrm];

cntm++;

if(cntp>depth) {
                            cntp--;

rp[cntrp++]=dsp[f];
                            for(i=f; i<cntp; i++) dsp[i]=dsp[i+1];
                            j=test();
                            if(j>0) return(j);
                            for(i=cntp; i>f; i--) dsp[i]=dsp[i-1];
                            dsp[f]=rp[--cntrp];

cntp++;
                    }
            }
            else {
                    cntp--;

rp[cntrp++]=dsp[f];
                    for(i=f; i<cntp; i++) dsp[i]=dsp[i+1];
                    j=test();
                    if(j>0) return(j);
                    for(i=cntp; i>f; i--) dsp[i]=dsp[i-1];
                    dsp[f]=rp[--cntrp];

cntp++;

if(cntm>depth) {
                            cntm--;

rm[cntrm++]=dsm[s];
```

```
                    for(i=s; i<cntm; i++) dsm[i]=dsm[i+1];
                    j=test();
                    if(j>0) return(j);
                    for(i=cntm; i>s; i--) dsm[i]=dsm[i-1];
                    dsm[s]=rm[--cntrm];

cntm++;
                }
            }
        }
        return(-1);
    }

// Check compatibility of current set and in case of conflicts tries to remove codes using
    r() Recursive!!!

int test(void) {
            int         i, j;
            presc=(presc+1)&0xffffff;
            if(presc==0) printf("iteration %d\r",iter++);
    //      printf("depth=%d cntm=%d cntp=%d\n",depth,cntm,cntp);
            for(i=(cntm-1); i>=0; i--) {
                if(wt[dsm[i]]==mid_en) {
                    for(j=(cntm-1); j>=0; j--) {
                        if(cmp[dsm[i]][dsm[j]]==0) {
                            if(cntm>depth) return(r(i,j,0));
                            else return(-1);
                        }
                    }
                }
                else {
                    for(j=(cntp-1); j>=0; j--) {
                        if(cmp[dsm[i]][dsp[j]]==0) {
                            if(max(cntm,cntp)>depth) return(r(i,j,0));
                            else return(-1);
                        }
                    }
                }
            }
    //      printf("half depth=%d cntm=%d cntp=%d\n",depth,cntm,cntp);

for(i=(cntp-1); i>=0; i--) {
                if(wt[dsp[i]]==mid_en) {
```

```
                    for(j=(cntp-1); j>=0; j--) {
                        if(cmp[dsp[i]][dsp[j]]==0) {
                            if(cntp>depth)  return(r(i,j,1));
                            else  return(-1);
                        }
                    }
                }
                else {
                    for(j=(cntm-1); j>=0; j--) {
                        if(cmp[dsp[i]][dsm[j]]==0) {
                            if(max(cntm,cntp)>depth) return(r(i,j,1));
                            else  return(-1);
                        }
                    }
                }
            }
            printf("\nDone\n");
            dump();
            return(depth);
        }

// if minimum pulse width in word code with length len not less than min
// and maximum pulse width is less or equal to max then returns 1 else 0 int inrange(code, len)

int         code, len;
        {
            int         i, j, k, l, m;

i=code&1;       // current bit
            j=1;            // same bits count
            k=-1;           // minimum
            l=0;            // maximum
            for(m=1; m<len; m++){
                if(((code>>m)&1)==i) j++;
                else {
                    if(k<0) k=len;
                    else k=min(k,j);
                    l=max(l,j);
                    i=i^1;
                    j=1;
                }
            }
            l=max(l,j);
```

```
                    return((((k>=min)||(k<0))&&(l<=max)) ? 1 : 0);
            } int     main (argc, argv)
            int             argc;
            char    **argv;
            {
            int             i, j, k, l;

if (argc != 9) {
                    printf("Usage:    cf    LENGTH    MINIMUM_PULSE_WIDTH  MAXIMUM_PULSE_WIDTH    START    END    TOP_TO_BOT_EN    DC_BAL_EN output_file_name\n");
                    exit(1);
            } sscanf(argv[1],"%d",&length);
            sscanf(argv[2],"%d",&min);
            sscanf(argv[3],"%d",&max);
            sscanf(argv[4],"%d",&start);
            sscanf(argv[5],"%d",&end);
            sscanf(argv[6],"%d",&top_en);
            sscanf(argv[7],"%d",&dc_bal_en);

if((min<=0)||(max<min)||(2*length<max)||(length>MAXLENGTH)) {
                    printf("Wrong    parameters    value.\nUsage:    cf    LENGTH MINIMUM_PULSE_WIDTH  MAXIMUM_PULSE_WIDTH  START  END  TOP_TO_BOT_EN DC_BAL_EN output_file_name\n");
                    exit(1);
            } ofile_name=argv[8];

// prepare for calculation
            min_bits=(dc_bal_en!=0)?(length-1)/2:0;    // minimum and miximum ones in code for DC balance
            max_bits=(dc_bal_en!=0)?(length+2)/2:0;

// -1 if 2 different weights used (odd code length) or if dc balance disabled, otherwise weight of the middle
            mid_en=(((max_bits-min_bits)==2)&&((dc_bal_en!=0)))?(max_bits+min_bits)/2:-1;

// prepare weight decoding table
```

```
        for(i=0; i<(2<<(length-1)); i++){
                weight[i]=0;
                if(dc_bal_en!=0) for(j=0; j<length; j++) weight[i]+=(i>>j)&1;
        }

// make initial filtering by finding codes which meets minimum and maximum pule requirements
        // and DC balance requirements
        // collect result in the stack c[]. nc - original number of codes.
        nc=0;
        for(i=0; i<(2<<(length-1)); i++) {
                if((weight[i]>=min_bits)&&(weight[i]<=max_bits)) {
                        if(inrange(i,length)!=0) {
                                if(nc<(MAXCODES-1)) c[nc++]=i;
                                else printf("Too many input codes, ignore %x\n",i);
                        }
                }
        }

// create compartibility table. first argument - first simbol in the channel
        for(i=0; i<nc; i++) {
                for(j=0; j<nc; j++) {
                        cmp[i][j]=inrange((c[i]<<length)|c[j],2*length);
                }
        }

// split all codes onto two groups: suitable for disparity -,+ and calculate weight of codes
        cntm=0;
        cntp=0;
        for(i=0; i<nc; i++) {
                wt[i]=weight[c[i]];
                if(((wt[i]<max_bits)&&((cmp[i][i]==1)||wt[i]!=mid_en))||(dc_bal_en==0))
dsm[cntm++]=i;
                if(((wt[i]>min_bits)&&((cmp[i][i]==1)||wt[i]!=mid_en))||(dc_bal_en==0))
dsp[cntp++]=i;
        } printf("found %d:%d codes\n",cntm,cntp);

// analize
        smc=0;
        spc=0;
        for(i=start; i<=end; i++) {
                sec(i);
```

```
                    if(min(minp,minm)>=i)  printf("for   %d   codes   matrix   size   is
%dx%d\n",i,cntm,cntp);
                    else end=i-1;
                }
                for(; smc>0; ) dsm[cntm++]=sm[--smc];
                for(; spc>0; ) dsp[cntp++]=sp[--spc];

sec(start);
        // start iterations
                cntrm=0;
                cntrp=0;
                iter=0;
                presc=0;

if(top_en!=0) {
                    depth=end;
                    spc=0;
                    smc=0;
                    do {
                        for(; smc>0; ) dsm[cntm++]=sm[--smc];
                        for(; spc>0; ) dsp[cntp++]=sp[--spc];
                        for(; cntrm>0; ) dsm[cntm++]=rm[--cntrm];
                        for(; cntrp>0; ) dsp[cntp++]=rp[--cntrp];
                        printf("\ntry to find %3d codes\n",depth);
                        sec(depth);
                        sort();
                        if ((ofile=fopen("bitmap.txt", "w"))==NULL){
                            printf("Can't open bitmap.txt for write\n");
                            exit(1);
                        }
                        for(i=0; i<nc; i++) {
                            for(j=0; j<nc; j++) {
                                fprintf(ofile,"%d",1-
(cmp[dsm[j]][dsp[i]]&cmp[dsp[i]][dsm[j]]));
                            }
                            fprintf(ofile,"\n");
                        }
                        fclose(ofile);

} while((test()<0)&&(depth-->start));
                }
                else {
                    depth=start-1;
```

```
            do {
                for(; cntrm>0; ) dsm[cntm++]=rm[--cntrm];
                for(; cntrp>0; ) dsp[cntp++]=rp[--cntrp];
                printf("\ntry to find %3d codes\n",++depth);
                sec(depth);
                sort();
                if ((ofile=fopen("bitmap.txt", "w"))==NULL){
                        printf("Can't open bitmap.txt for write\n");
                        exit(1);
                }
                for(i=0; i<nc; i++) {
                        for(j=0; j<nc; j++) {
                                fprintf(ofile,"%d",1-
(cmp[dsm[j]][dsp[i]]&cmp[dsp[i]][dsm[j]]));
                        }
                        fprintf(ofile,"\n");
                }
                fclose(ofile);
        } while((cntp>=depth)&&(cntm>=depth)&&(test()>0));
        if(min(cntp,cntm)<depth)  printf("Can  not  find  code  with  %d
symbols\n",depth);
        }
        exit(0);
}
```

Appendix C: Code table for 8b/16b encoding with the same criteria of DC balance, minimum pulse width and maximum transition interval.

Table 1

Negative disparity table 1. 0000001111000111
2. 0000001111001111
3. 0000001111100011
4. 0000001111100111
5. 0000001111110011
6. 0000001111111000
7. 0000001111111100
8. 0000011001100111
9. 0000011001110011
10. 0000011001111100
11. 0000011100001111
12. 0000011100110011
13. 0000011100111100
14. 0000011110000111
15. 0000011110001111
16. 0000011110011100
17. 0000011111000011
18. 0000011111000111
19. 0000011111001100
20. 0000011111100011
21. 0000011111110000
22. 0000011111111000
23. 0000110001100111
24. 0000110001110011
25. 0000110001111100
26. 0000110011000111
27. 0000110011001111
28. 0000110011100011
29. 0000110011100111
30. 0000110011110011
31. 0000110011111000
32. 0000110011111100
33. 0000111000001111
34. 0000111000110011
35. 0000111000111100
36. 0000111001100011
37. 0000111001100111
38. 0000111001110011
39. 0000111001111000
40. 0000111001111100
41. 0000111100000111
42. 0000111100001111
43. 0000111100011100
44. 0000111100110011
45. 0000111100111000
46. 0000111100111100
47. 0000111110000011
48. 0000111110000111
49. 0000111110001100
50. 0000111110011000
51. 0000111110011100
52. 0000111111000011
53. 0000111111001100
54. 0001100001100111
55. 0001100001110011
56. 0001100001111100
57. 0001100011000111
58. 0001100011001111
59. 0001100011100011
60. 0001100011100111
61. 0001100011110011
62. 0001100011111000
63. 0001100011111100
64. 0001100110000111
65. 0001100110001111
66. 0001100110011100
67. 0001100111000011
68. 0001100111000111
69. 0001100111001100
70. 0001100111100011
71. 0001100111110000
72. 0001100111111000
73. 0001110000001111
74. 0001110000110011
75. 0001110000111100
76. 0001110001100011
77. 0001110001100111
78. 0001110001110011
79. 0001110001111000
80. 0001110001111100

40

| | |
|---|---|
| 81. | 0001110011000011 |
| 82. | 0001110011000111 |
| 83. | 0001110011001100 |
| 84. | 0001110011100011 |
| 85. | 0001110011110000 |
| 86. | 0001110011111000 |
| 87. | 0001111000000111 |
| 88. | 0001111000001111 |
| 89. | 0001111000011100 |
| 90. | 0001111000110011 |
| 91. | 0001111000111000 |
| 92. | 0001111000111100 |
| 93. | 0001111001100011 |
| 94. | 0001111001110000 |
| 95. | 0001111001111000 |
| 96. | 0001111100000011 |
| 97. | 0001111100000111 |
| 98. | 0001111100001100 |
| 99. | 0001111100011000 |
| 100. | 0001111100011100 |
| 101. | 0001111100110000 |
| 102. | 0001111100111000 |
| 103. | 0001111110000011 |
| 104. | 0001111110001100 |
| 105. | 0001111110011000 |
| 106. | 0011000001100111 |
| 107. | 0011000001110011 |
| 108. | 0011000001111100 |
| 109. | 0011000011000111 |
| 110. | 0011000011001111 |
| 111. | 0011000011100011 |
| 112. | 0011000011100111 |
| 113. | 0011000011110011 |
| 114. | 0011000011111000 |
| 115. | 0011000011111100 |
| 116. | 0011000110000111 |
| 117. | 0011000110001111 |
| 118. | 0011000110011100 |
| 119. | 0011000111000011 |
| 120. | 0011000111000111 |
| 121. | 0011000111001100 |
| 122. | 0011000111100011 |
| 123. | 0011000111110000 |
| 124. | 0011000111111000 |
| 125. | 0011001100000111 |
| 126. | 0011001100001111 |
| 127. | 0011001100011100 |
| 128. | 0011001100110011 |
| 129. | 0011001100111000 |
| 130. | 0011001100111100 |
| 131. | 0011001110000011 |
| 132. | 0011001110000111 |
| 133. | 0011001110001100 |
| 134. | 0011001110011000 |
| 135. | 0011001110011100 |
| 136. | 0011001111000011 |
| 137. | 0011001111001100 |
| 138. | 0011001111100000 |
| 139. | 0011100000001111 |
| 140. | 0011100000110011 |
| 141. | 0011100000111100 |
| 142. | 0011100001100011 |
| 143. | 0011100001100111 |
| 144. | 0011100001110011 |
| 145. | 0011100001111000 |
| 146. | 0011100001111100 |
| 147. | 0011100011000011 |
| 148. | 0011100011000111 |
| 149. | 0011100011001100 |
| 150. | 0011100011100011 |
| 151. | 0011100011110000 |
| 152. | 0011100011111000 |
| 153. | 0011100110000011 |
| 154. | 0011100110000111 |
| 155. | 0011100110001100 |
| 156. | 0011100110011000 |
| 157. | 0011100110011100 |
| 158. | 0011100111000011 |
| 159. | 0011100111001100 |
| 160. | 0011100111100000 |
| 161. | 0011110000000111 |
| 162. | 0011110000001111 |
| 163. | 0011110000011100 |
| 164. | 0011110000110011 |
| 165. | 0011110000111000 |
| 166. | 0011110000111100 |
| 167. | 0011110001100011 |
| 168. | 0011110001110000 |
| 169. | 0011110001111000 |
| 170. | 0011110011000011 |

41

| | | |
|---|---|---|
| 171. | 0011110011001100 | |
| 172. | 0011110011100000 | |
| 173. | 0011111000000011 | |
| 174. | 0011111000000111 | |
| 175. | 0011111000001100 | |
| 176. | 0011111000011000 | |
| 177. | 0011111000011100 | |
| 178. | 0011111000110000 | |
| 179. | 0011111000111000 | |
| 180. | 0011111001100000 | |
| 181. | 0011111100000011 | |
| 182. | 0011111100001100 | |
| 183. | 0011111100011000 | |
| 184. | 1100000001100111 | |
| 185. | 1100000001110011 | |
| 186. | 1100000001111100 | |
| 187. | 1100000011000111 | |
| 188. | 1100000011001111 | |
| 189. | 1100000011100011 | |
| 190. | 1100000011100111 | |
| 191. | 1100000011110011 | |
| 192. | 1100000011111000 | |
| 193. | 1100000011111100 | |
| 194. | 1100000110000111 | |
| 195. | 1100000110001111 | |
| 196. | 1100000110011100 | |
| 197. | 1100000111000011 | |
| 198. | 1100000111000111 | |
| 199. | 1100000111001100 | |
| 200. | 1100000111100011 | |
| 201. | 1100000111110000 | |
| 202. | 1100000111111000 | |
| 203. | 1100001100000111 | |
| 204. | 1100001100001111 | |
| 205. | 1100001100011100 | |
| 206. | 1100001100110011 | |
| 207. | 1100001100111000 | |
| 208. | 1100001100111100 | |
| 209. | 1100001110000011 | |
| 210. | 1100001110000111 | |
| 211. | 1100001110001100 | |
| 212. | 1100001110011000 | |
| 213. | 1100001110011100 | |
| 214. | 1100001111000011 | |
| 215. | 1100001111001100 | |
| 216. | 1100001111100000 | |
| 217. | 1100011000000111 | |
| 218. | 1100011000001111 | |
| 219. | 1100011000011100 | |
| 220. | 1100011000110011 | |
| 221. | 1100011000111000 | |
| 222. | 1100011000111100 | |
| 223. | 1100011001100011 | |
| 224. | 1100011001110000 | |
| 225. | 1100011001111000 | |
| 226. | 1100011100000011 | |
| 227. | 1100011100000111 | |
| 228. | 1100011100001100 | |
| 229. | 1100011100011000 | |
| 230. | 1100011100011100 | |
| 231. | 1100011100110000 | |
| 232. | 1100011100111000 | |
| 233. | 1100011110000011 | |
| 234. | 1100011110001100 | |
| 235. | 1100011110011000 | |
| 236. | 1100110000000111 | |
| 237. | 1100110000001111 | |
| 238. | 1100110000011100 | |
| 239. | 1100110000110011 | |
| 240. | 1100110000111000 | |
| 241. | 1100110000111100 | |
| 242. | 1100110001100011 | |
| 243. | 1100110001110000 | |
| 244. | 1100110001111000 | |
| 245. | 1100110011000011 | |
| 246. | 1100110011001100 | |
| 247. | 1100110011100000 | |
| 248. | 1100111000000011 | |
| 249. | 1100111000000111 | |
| 250. | 1100111000001100 | |
| 251. | 1100111000011000 | |
| 252. | 1100111000011100 | |
| 253. | 1100111000110000 | |
| 254. | 1100111000111000 | |
| 255. | 1100111001100000 | |
| 256. | 1100111100000011 | |
| 257. | 1100111100011000 | |
| 258. | 1110000000001111 | |
| 259. | 1110000000110011 | |
| 260. | 1110000000111100 | |

42

| # | Code | | # | Code |
|---|---|---|---|---|
| 261. | 1110000001100011 | | 306. | 1111000000111100 |
| 262. | 1110000001100111 | | 307. | 1111000001100011 |
| 263. | 1110000001110011 | | 308. | 1111000001110000 |
| 264. | 1110000001111000 | | 309. | 1111000001111000 |
| 265. | 1110000001111100 | | 310. | 1111000011000011 |
| 266. | 1110000011000011 | | 311. | 1111000011001100 |
| 267. | 1110000011000111 | | 312. | 1111000011100000 |
| 268. | 1110000011001100 | | 313. | 1111000110000011 |
| 269. | 1110000011100011 | | 314. | 1111000110001100 |
| 270. | 1110000011110000 | | 315. | 1111000110011000 |
| 271. | 1110000011111000 | | 316. | 1111001100000011 |
| 272. | 1110000110000011 | | 317. | 1111001100001100 |
| 273. | 1110000110000111 | | 318. | 1111001100011000 |
| 274. | 1110000110001100 | | | |
| 275. | 1110000110011000 | | | |
| 276. | 1110000110011100 | | | |
| 277. | 1110000111000011 | | | |
| 278. | 1110000111001100 | | | |
| 279. | 1110000111100000 | | | |
| 280. | 1110001100000011 | | | |
| 281. | 1110001100000111 | | | |
| 282. | 1110001100001100 | | | |
| 283. | 1110001100011000 | | | |
| 284. | 1110001100011100 | | | |
| 285. | 1110001100110000 | | | |
| 286. | 1110001100111000 | | | |
| 287. | 1110001110000011 | | | |
| 288. | 1110001110001100 | | | |
| 289. | 1110001110011000 | | | |
| 290. | 1110011000000011 | | | |
| 291. | 1110011000000111 | | | |
| 292. | 1110011000001100 | | | |
| 293. | 1110011000011000 | | | |
| 294. | 1110011000011100 | | | |
| 295. | 1110011000110000 | | | |
| 296. | 1110011000111000 | | | |
| 297. | 1110011001100000 | | | |
| 298. | 1110011100000011 | | | |
| 299. | 1110011100001100 | | | |
| 300. | 1110011100011000 | | | |
| 301. | 1111000000000111 | | | |
| 302. | 1111000000001111 | | | |
| 303. | 1111000000011100 | | | |
| 304. | 1111000000110011 | | | |
| 305. | 1111000000111000 | | | |

Positive disparity codes 1. 0000110011001111
2. 0000110011100111
3. 0000110011110011
4. 0000110011111100
5. 0000111001100111
6. 0000111001110011
7. 0000111001111100
8. 0000111100001111
9. 0000111100110011
10. 0000111100111100
11. 0000111110000111
12. 0000111110001111
13. 0000111110011100
14. 0000111111000011
15. 0000111111000111
16. 0000111111001100
17. 0000111111100011
18. 0000111111110000
19. 0000111111111000
20. 0001100011001111
21. 0001100011100111
22. 0001100011110011
23. 0001100011111100
24. 0001100110001111
25. 0001100111000111
26. 0001100111001111
27. 0001100111100011
28. 0001100111100111
29. 0001100111110011

43

| | |
|---|---|
| 30. | 0001100111111000 |
| 31. | 0001100111111100 |
| 32. | 0001110001100111 |
| 33. | 0001110001110011 |
| 34. | 0001110001111100 |
| 35. | 0001110011000111 |
| 36. | 0001110011001111 |
| 37. | 0001110011100011 |
| 38. | 0001110011100111 |
| 39. | 0001110011110011 |
| 40. | 0001110011111000 |
| 41. | 0001110011111100 |
| 42. | 0001111000001111 |
| 43. | 0001111000110011 |
| 44. | 0001111000111100 |
| 45. | 0001111001100011 |
| 46. | 0001111001100111 |
| 47. | 0001111001110011 |
| 48. | 0001111001111000 |
| 49. | 0001111001111100 |
| 50. | 0001111100000111 |
| 51. | 0001111100001111 |
| 52. | 0001111100011100 |
| 53. | 0001111100110011 |
| 54. | 0001111100111000 |
| 55. | 0001111100111100 |
| 56. | 0001111110000011 |
| 57. | 0001111110000111 |
| 58. | 0001111110001100 |
| 59. | 0001111110011000 |
| 60. | 0001111110011100 |
| 61. | 0001111111000011 |
| 62. | 0001111111001100 |
| 63. | 0001111111100000 |
| 64. | 0011000011001111 |
| 65. | 0011000011100111 |
| 66. | 0011000011110011 |
| 67. | 0011000011111100 |
| 68. | 0011000110001111 |
| 69. | 0011000111000111 |
| 70. | 0011000111001111 |
| 71. | 0011000111100011 |
| 72. | 0011000111100111 |
| 73. | 0011000111110011 |
| 74. | 0011000111111000 |
| 75. | 0011000111111100 |
| 76. | 0011001100001111 |
| 77. | 0011001100110011 |
| 78. | 0011001100111100 |
| 79. | 0011001110000111 |
| 80. | 0011001110001111 |
| 81. | 0011001110011100 |
| 82. | 0011001111000011 |
| 83. | 0011001111000111 |
| 84. | 0011001111001100 |
| 85. | 0011001111100011 |
| 86. | 0011001111110000 |
| 87. | 0011001111111000 |
| 88. | 0011100001100111 |
| 89. | 0011100001110011 |
| 90. | 0011100001111100 |
| 91. | 0011100011000111 |
| 92. | 0011100011001111 |
| 93. | 0011100011100011 |
| 94. | 0011100011100111 |
| 95. | 0011100011110011 |
| 96. | 0011100011111000 |
| 97. | 0011100011111100 |
| 98. | 0011100110000111 |
| 99. | 0011100110001111 |
| 100. | 0011100110011100 |
| 101. | 0011100111000011 |
| 102. | 0011100111000111 |
| 103. | 0011100111001100 |
| 104. | 0011100111100011 |
| 105. | 0011100111110000 |
| 106. | 0011100111111000 |
| 107. | 0011110000001111 |
| 108. | 0011110000011111 |
| 109. | 0011110000110011 |
| 110. | 0011110000111100 |
| 111. | 0011110001100011 |
| 112. | 0011110001100111 |
| 113. | 0011110001110011 |
| 114. | 0011110001111000 |
| 115. | 0011110001111100 |
| 116. | 0011110011000011 |
| 117. | 0011110011000111 |
| 118. | 0011110011001100 |
| 119. | 0011110011100011 |

44

| # | code | | # | code |
|---|---|---|---|---|
| 120. | 0011110011110000 | | 165. | 1100001111110000 |
| 121. | 0011110011111000 | | 166. | 1100001111111000 |
| 122. | 0011111000000111 | | 167. | 1100011000001111 |
| 123. | 0011111000001111 | | 168. | 1100011000011111 |
| 124. | 0011111000011100 | | 169. | 1100011000110011 |
| 125. | 0011111000110011 | | 170. | 1100011000111100 |
| 126. | 0011111000111000 | | 171. | 1100011001100011 |
| 127. | 0011111000111100 | | 172. | 1100011001100111 |
| 128. | 0011111001100011 | | 173. | 1100011001110011 |
| 129. | 0011111001110000 | | 174. | 1100011001111000 |
| 130. | 0011111001111000 | | 175. | 1100011001111100 |
| 131. | 0011111100000011 | | 176. | 1100011100000111 |
| 132. | 0011111100000111 | | 177. | 1100011100001111 |
| 133. | 0011111100001100 | | 178. | 1100011100011100 |
| 134. | 0011111100011000 | | 179. | 1100011100110011 |
| 135. | 0011111100011100 | | 180. | 1100011100111000 |
| 136. | 0011111100110000 | | 181. | 1100011100111100 |
| 137. | 0011111100111000 | | 182. | 1100011110000011 |
| 138. | 0011111110000011 | | 183. | 1100011110000111 |
| 139. | 0011111110001100 | | 184. | 1100011110001100 |
| 140. | 0011111110011000 | | 185. | 1100011110011000 |
| 141. | 1100000011001111 | | 186. | 1100011110011100 |
| 142. | 1100000011100111 | | 187. | 1100011111000011 |
| 143. | 1100000011110011 | | 188. | 1100011111001100 |
| 144. | 1100000011111100 | | 189. | 1100011111100000 |
| 145. | 1100000110001111 | | 190. | 1100110000001111 |
| 146. | 1100000110011111 | | 191. | 1100110000011111 |
| 147. | 1100000111000111 | | 192. | 1100110000110011 |
| 148. | 1100000111001111 | | 193. | 1100110000111100 |
| 149. | 1100000111100011 | | 194. | 1100110001100011 |
| 150. | 1100000111100111 | | 195. | 1100110001100111 |
| 151. | 1100000111110011 | | 196. | 1100110001110011 |
| 152. | 1100000111111000 | | 197. | 1100110001111000 |
| 153. | 1100000111111100 | | 198. | 1100110001111100 |
| 154. | 1100001100001111 | | 199. | 1100110011000011 |
| 155. | 1100001100011111 | | 200. | 1100110011000111 |
| 156. | 1100001100110011 | | 201. | 1100110011001100 |
| 157. | 1100001100111100 | | 202. | 1100110011100011 |
| 158. | 1100001110000111 | | 203. | 1100110011110000 |
| 159. | 1100001110001111 | | 204. | 1100110011111000 |
| 160. | 1100001110011100 | | 205. | 1100111000000111 |
| 161. | 1100001111000011 | | 206. | 1100111000001111 |
| 162. | 1100001111000111 | | 207. | 1100111000011100 |
| 163. | 1100001111001100 | | 208. | 1100111000110011 |
| 164. | 1100001111100011 | | 209. | 1100111000111000 |

45

| # | Code | | # | Code |
|---|---|---|---|---|
| 210. | 1100111000111100 | | 255. | 1110001111001100 |
| 211. | 1100111001100011 | | 256. | 1110001111100000 |
| 212. | 1100111001110000 | | 257. | 1110011000000111 |
| 213. | 1100111001111000 | | 258. | 1110011000001111 |
| 214. | 1100111100000011 | | 259. | 1110011000011100 |
| 215. | 1100111100000111 | | 260. | 1110011000110011 |
| 216. | 1100111100001100 | | 261. | 1110011000111000 |
| 217. | 1100111100011000 | | 262. | 1110011000111100 |
| 218. | 1100111100011100 | | 263. | 1110011001100011 |
| 219. | 1100111100110000 | | 264. | 1110011001110000 |
| 220. | 1100111100111000 | | 265. | 1110011001111000 |
| 221. | 1100111110000011 | | 266. | 1110011100000011 |
| 222. | 1100111110001100 | | 267. | 1110011100000111 |
| 223. | 1100111110011000 | | 268. | 1110011100001100 |
| 224. | 1110000001100111 | | 269. | 1110011100011000 |
| 225. | 1110000001110011 | | 270. | 1110011100110000 |
| 226. | 1110000001111100 | | 271. | 1110011100111000 |
| 227. | 1110000011000111 | | 272. | 1110011110000011 |
| 228. | 1110000011001111 | | 273. | 1110011110001100 |
| 229. | 1110000011100011 | | 274. | 1110011110011000 |
| 230. | 1110000011100111 | | 275. | 1111000000001111 |
| 231. | 1110000011110011 | | 276. | 1111000000011111 |
| 232. | 1110000011111000 | | 277. | 1111000000110011 |
| 233. | 1110000011111100 | | 278. | 1111000000111100 |
| 234. | 1110000110000111 | | 279. | 1111000001100011 |
| 235. | 1110000110001111 | | 280. | 1111000001100111 |
| 236. | 1110000110011100 | | 281. | 1111000001110011 |
| 237. | 1110000111000011 | | 282. | 1111000001111000 |
| 238. | 1110000111000111 | | 283. | 1111000001111100 |
| 239. | 1110000111001100 | | 284. | 1111000011000011 |
| 240. | 1110000111100011 | | 285. | 1111000011000111 |
| 241. | 1110000111110000 | | 286. | 1111000011001100 |
| 242. | 1110000111111000 | | 287. | 1111000011100011 |
| 243. | 1110001100000111 | | 288. | 1111000011110000 |
| 244. | 1110001100001111 | | 289. | 1111000011111000 |
| 245. | 1110001100011100 | | 290. | 1111000110000011 |
| 246. | 1110001100110011 | | 291. | 1111000110000111 |
| 247. | 1110001100111000 | | 292. | 1111000110001100 |
| 248. | 1110001100111100 | | 293. | 1111000110011000 |
| 249. | 1110001110000011 | | 294. | 1111000110011100 |
| 250. | 1110001110000111 | | 295. | 1111000111000011 |
| 251. | 1110001110001100 | | 296. | 1111000111001100 |
| 252. | 1110001110011000 | | 297. | 1111000111100000 |
| 253. | 1110001110011100 | | 298. | 1111001100000011 |
| 254. | 1110001111000011 | | 299. | 1111001100000111 |

46

| | | | | |
|---|---|---|---|---|
| 300. | 1111001100001100 | | 310. | 1111100000111000 |
| 301. | 1111001100011000 | | 311. | 1111100000111100 |
| 302. | 1111001100011100 | | 312. | 1111100001100011 |
| 303. | 1111001100110000 | | 313. | 1111100001111000 |
| 304. | 1111001100111000 | | 314. | 1111100011000011 |
| 305. | 1111001110000011 | | 315. | 1111100011001100 |
| 306. | 1111001110001100 | | 316. | 1111100110000011 |
| 307. | 1111001110011000 | | 317. | 1111100110001100 |
| 308. | 1111100000000111 | | 318. | 1111100110011000 |
| 309. | 1111100000011100 | | | |

Appendix D

Example implementation of 8 bits into 13 bits encoding means as a synthesisable Verilog model.

```
`timescale 1ns / 1ps
module coder_8b13b_fast(
            clock,      // clock reset,    // power up reset
            din,        // Data in
            cin,        // Command in
            out,        // data output
            encerr);    // encoding error (reserved input)
    input       clock;
    input       reset;       // system reset. Active high
    input [7:0] din;         // msb=7 lsb=0
    input       cin;         // 1 - Command, 0 - data
    output [12:0] out;       // msb=0 lsb=12
    output      encerr;      // 1 = error
//---------------------
// control codes:
//---------------------
    parameter   ENC0_IP =   9'h11C;
    parameter   ENC1_IP =   9'h13C;
    parameter   ENC2_IP =   9'h15C;
    parameter   ENC3_IP =   9'h17C;
    parameter   ENC4_IP =   9'h19C;
    parameter   ENC5_IP =   9'h1BC;
    parameter   ENC6_IP =   9'h1DC;
    parameter   ENC7_IP =   9'h1FC;
    parameter   ENC8_IP =   9'h1F7;
    parameter   ENC9_IP =   9'h1FB;
    parameter   IDLE_IP =   9'h1FD;
    parameter   COMM_IP =   9'h1FE;
    parameter   ENCA_IP =   9'h1FF;
    parameter   ENCB_IP =   9'h1FA; // ??
//---------------------
// control encoding 11 of 13
// end bits are both replicated
//---------------------
    parameter   ENC0  =  11'b00001110000;
    parameter   ENC1  =  11'b11110001111;
    parameter   ENC2  =  11'b00011111000;
    parameter   ENC3  =  11'b11100000111;
    parameter   ENC4  =  11'b00110001100;
    parameter   ENC5  =  11'b11001110011;
    parameter   ENC6  =  11'b00111111100;
```

```
parameter  ENC7  =  11'b11000000011;
parameter  ENC8  =  11'b01100000110;
parameter  ENC9  =  11'b10011111001;
parameter  IDLE  =  11'b01110001110;
parameter  COMM  =  11'b10001110001;
parameter  ENCA  =  11'b01111111110;
parameter  ENCB  =  11'b10000000001;
//-------------------------------------------
// internal signals:
//                    registers           wires
//------------------------------------------- reg   [08:0] inputlatch;        // latch input code
reg   [09:0] data,              data_i;     // latch raw encoding
reg   [10:0] comm,              comm_i;     // command/databar
reg   [12:0] out;                           // output encoding
wire  [12:0]                    out_i;
wire  [9:0]                     reflt;      // reflected bits
reg   encerr,                   encerr_i;   // input error line
reg   command,                  command_i;  // latched cin
reg   invert,                   invert_i;   // invert raw data encoding
reg   reflect,                  reflect_i;  // reflect raw data encoding
//-----------------
// code:
//-----------------
// assign final latch stage assign  out_i = command ? {comm[10],comm[10:0],comm[0]}:
                invert  ? ~{reflt[9],reflt[9:5],1'b0,reflt[4:0],reflt[0]}:
                          {reflt[9],reflt[9:5],1'b0,reflt[4:0],reflt[0]};

assign  reflt = reflect  ?  {data[00],data[01],data[02],
                             data[03],data[04],data[05],
                             data[06],data[07],data[08],
                             data[09]}:
                             data[9:0];
// assign encoding stage (combinatorial)

always @(inputlatch)
begin
  if (inputlatch[8])
    begin       // Command encodings
      command_i  <= 1'b1;
      invert_i   <= 1'b0; // not used
      reflect_i  <= 1'b0; // not used
```

49

```
            data_i       <=    IDLE;
    case ({inputlatch[8:0]})
        IDLE_IP : begin comm_i <= IDLE; encerr_i <= 1'b0; end
        COMM_IP : begin comm_i <= COMM; encerr_i <= 1'b0; end
        ENC0_IP : begin comm_i <= ENC0; encerr_i <= 1'b0; end
        ENC1_IP : begin comm_i <= ENC1; encerr_i <= 1'b0; end
        ENC2_IP : begin comm_i <= ENC2; encerr_i <= 1'b0; end
        ENC3_IP : begin comm_i <= ENC3; encerr_i <= 1'b0; end
        ENC4_IP : begin comm_i <= ENC4; encerr_i <= 1'b0; end
        ENC5_IP : begin comm_i <= ENC5; encerr_i <= 1'b0; end
        ENC6_IP : begin comm_i <= ENC6; encerr_i <= 1'b0; end
        ENC7_IP : begin comm_i <= ENC7; encerr_i <= 1'b0; end
        ENC8_IP : begin comm_i <= ENC8; encerr_i <= 1'b0; end
        ENC9_IP : begin comm_i <= ENC9; encerr_i <= 1'b0; end
        ENCA_IP : begin comm_i <= ENCA; encerr_i <= 1'b0; end
        ENCB_IP :      begin comm_i <= ENCB; encerr_i <= 1'b0; end default : begin comm_i <= IDLE; encerr_i <= 1'b1; end
    endcase
        end
        else
        begin                           // data encoding note: 5 top bits & 5 bottom
    command_i    <= 1'b0;
        invert_i         <= inputlatch[7];
        reflect_i    <= inputlatch[6];
        comm_i       <= IDLE;
        encerr_i   <= 1'b0;
    case ({inputlatch[5:0]})
        6'h00   : begin data_i <= 10'b0111011111; end
        6'h01   : begin data_i <= 10'b1111011111; end
        6'h02   : begin data_i <= 10'b0111001111; end
        6'h03   : begin data_i <= 10'b0111011110; end
        6'h04   : begin data_i <= 10'b0011001111; end
        6'h05   : begin data_i <= 10'b0011011111; end
        6'h06   : begin data_i <= 10'b0011001110; end
        6'h07   : begin data_i <= 10'b0011011110; end
        6'h08   : begin data_i <= 10'b0011101111; end
        6'h09   : begin data_i <= 10'b0111101111; end
        6'h0A   : begin data_i <= 10'b0011101110; end
        6'h0B   : begin data_i <= 10'b0011011100; end
        6'h0C   : begin data_i <= 10'b0001101111; end
        6'h0D   : begin data_i <= 10'b1001101111; end
        6'h0E   : begin data_i <= 10'b0001101110; end
        6'h0F   : begin data_i <= 10'b0001101100; end
        6'h10   : begin data_i <= 10'b1100011111; end
```

```
6'h11 : begin data_i <= 10'b1110011111; end
6'h12 : begin data_i <= 10'b0110011110; end
6'h13 : begin data_i <= 10'b0110011111; end
6'h14 : begin data_i <= 10'b1100001111; end
6'h15 : begin data_i <= 10'b1110001111; end
6'h16 : begin data_i <= 10'b0110001110; end
6'h17 : begin data_i <= 10'b0110001111; end
6'h18 : begin data_i <= 10'b0000011111; end
6'h19 : begin data_i <= 10'b1000011111; end
6'h1A : begin data_i <= 10'b0000011100; end
6'h1B : begin data_i <= 10'b0000011110; end
6'h1C : begin data_i <= 10'b0000001111; end
6'h1D : begin data_i <= 10'b1000001111; end
6'h1E : begin data_i <= 10'b0000001100; end
6'h1F : begin data_i <= 10'b0000001110; end
6'h20 : begin data_i <= 10'b0111100111; end
6'h21 : begin data_i <= 10'b0011100111; end
6'h22 : begin data_i <= 10'b0111000111; end
6'h23 : begin data_i <= 10'b0011000111; end
6'h24 : begin data_i <= 10'b0111100011; end
6'h25 : begin data_i <= 10'b0011100011; end
6'h26 : begin data_i <= 10'b0111000011; end
6'h27 : begin data_i <= 10'b0011000011; end
6'h28 : begin data_i <= 10'b0111100001; end
6'h29 : begin data_i <= 10'b0011100001; end
6'h2A : begin data_i <= 10'b0111000001; end
6'h2B : begin data_i <= 10'b0011000001; end
6'h2C : begin data_i <= 10'b0111011001; end
6'h2D : begin data_i <= 10'b0011011001; end
6'h2E : begin data_i <= 10'b0011100110; end
6'h2F : begin data_i <= 10'b0011000110; end
6'h30 : begin data_i <= 10'b0110000111; end
6'h31 : begin data_i <= 10'b0110000011; end
6'h32 : begin data_i <= 10'b0110011001; end
6'h33 : begin data_i <= 10'b0110000001; end
6'h34 : begin data_i <= 10'b0001100111; end
6'h35 : begin data_i <= 10'b0001100011; end
6'h36 : begin data_i <= 10'b0000011001; end
6'h37 : begin data_i <= 10'b0001100001; end
6'h38 : begin data_i <= 10'b1001100111; end
6'h39 : begin data_i <= 10'b0001100110; end
6'h3A : begin data_i <= 10'b1000000111; end
6'h3B : begin data_i <= 10'b1100000111; end
6'h3C : begin data_i <= 10'b1000011001; end
6'h3D : begin data_i <= 10'b0000011000; end
```

```
        6'h3E  : begin data_i <= 10'b1000000011; end
        6'h3F  : begin data_i <= 10'b1001100011; end
        default : begin data_i <= {10{1'bx}}; end
      endcase
    end
  end
//----------------------
// clocked process
//----------------------
always @(posedge clock or posedge reset)        // async reset
//always @(posedge clock)                       // sync reset
begin
  if (reset)
  begin
        inputlatch   <=    IDLE_IP;    // comma instead of data 0 don't know
                                       // how user interprets data 0
        comm         <=    IDLE;
        data         <=    IDLE;
        command      <=    1'b1;
        invert       <=    1'b0;
    reflect    <= 1'b0;
        encerr_i     <=    1'b0;
        out          <=    {IDLE[10],IDLE,IDLE[0]};
    end
    else
    begin
        inputlatch   <=    {cin,din};
        comm         <=    comm_i;
        data         <=    data_i;
        command      <=    command_i;
        invert       <=    invert_i;
    reflect    <= reflect_i;
        encerr       <=    encerr_i;
        out          <=    out_i;
    end
end
endmodule
```

Appendix E
Example implementation of 13 bits into 8 bits decoding means as a synthesisable Verilog model.

```
5   `timescale 1ns / 1ps
    module decoder_8b13b_fast(
                clock,          // clock
                reset,          // power up reset
                din,            // Data in
10              cmd,            // Command out
                out,            // data output
                error);         // error detected output
        input       clock;
        input       reset;          // system reset. Active high
15      input  [12:0] din;          // msb=0 lsb=12
        output      cmd;            // 1 - Command, 0 - data
        output [7:0] out;           // msb=7 lsb=0
        output      error;          // error detected
    //---------------------
20  // control codes:
    //---------------------
        parameter   ENC0_OP =   8'h1C;
        parameter   ENC1_OP =   8'h3C;
        parameter   ENC2_OP =   8'h5C;
25      parameter   ENC3_OP =   8'h7C;
        parameter   ENC4_OP =   8'h9C;
        parameter   ENC5_OP =   8'hBC;
        parameter   ENC6_OP =   8'hDC;
        parameter   ENC7_OP =   8'hFC;
30      parameter   ENC8_OP =   8'hF7;
        parameter   ENC9_OP =   8'hFB;
        parameter   IDLE_OP =   8'hFD;
        parameter   COMM_OP =   8'hFE;
        parameter   ENCA_OP =   8'hFF;
35      parameter   ENCB_OP =   8'hFA; // ??
    //---------------------
    // control encoding
    //---------------------
        parameter   ENC0    =   13'b0000011100000;
40      parameter   ENC1    =   13'b1111100011111;
        parameter   ENC2    =   13'b0000111110000;
        parameter   ENC3    =   13'b1111000001111;
        parameter   ENC4    =   13'b0001100011000;
        parameter   ENC5    =   13'b1110011100111;
45      parameter   ENC6    =   13'b0001111111000;
```

```
        parameter   ENC7   =    13'b1110000000111;
        parameter   ENC8   =    13'b0011000001100;
        parameter   ENC9   =    13'b1100111110011;
        parameter   IDLE   =    13'b0011100011100;
 5      parameter   COMM   =    13'b1100011100011;
        parameter   ENCA   =    13'b0011111111100;
        parameter   ENCB   =    13'b1100000000011;

//--------------------------------------------
10      // internal signals:
        //                  registers          wires
        //--------------------------------------------
        reg         cmd;               // output command/databar bit
        wire                           cmd_i;
15      reg         cmdl_d,
                    cmdl;
        wire                           // stage latch command bit
                                       cmdl_i;
        reg         refl,     refl_i,
                    refd;              // bits were reflected
20      reg   [5:2] pred;              // part decode bits
        wire  [5:2]           pred_i;
        reg   [7:0] out,      out_c,   // output instruction/data
                    out_du;            // lower decode
        wire  [7:0]           out_i,            out_d;
25      reg  [12:0] din_latch;         // input latch for encoded din
        reg  [12:0] rfl_latch;         // stage latch for reflected encoded din
        wire [12:0] rfl_latch_i,       rfl_latch_p;
        wire                  cmdt_i,
                              errt_i;
30      reg  [12:0] stg_latch;
        reg  [12:0]           stg_latch_i;// stage latch
        reg         errl,     errl_i,
                    errl_d;
        reg         error;
35      wire                  error_i;
        integer     i;
        //---------------------
        // code:
        //---------------------
40      // invert data into rfl_latch ready for refection, rfl_latch[6] holds sense
        assign  rfl_latch_i =    cmdl_i | ~din_latch[6] ? din_latch:
                                 {~din_latch[12:7],1'b1,~din_latch[5:0]};
        assign  rfl_latch_p = rfl_latch;
        // all commands are mirrors
45      assign       cmdl_i        =    (~|(din_latch[11:7]^{din_latch[1],din_latch[2],
```

```
                    din_latch[3],din_latch[4],din_latch[5]}))&&
              ((&din_latch[7:5])||(~|din_latch[7:5]));
      // simple error detect, bits must have a partner
      always @(din_latch)
5     begin
        errl_i <= 1'b0;
        for(i=1;i<12;i=i+1)
        begin
          if((din_latch[i] != din_latch[i-1]) && (din_latch[i] != din_latch[i+1]))
10        begin
          errl_i <= 1'b1;
          end
        end
        if((din_latch[12] != din_latch[11]) || (din_latch[1] != din_latch[0]))
15      begin
          errl_i <= 1'b1;
        end
      // simple error detect, 16 bit sequence maximum
      casex(din_latch)
20        14'b1_??????_?_?????? : errl_i <= 1'b1;
          14'b?_000000_?_00???? : errl_i <= 1'b1;
          14'b?_111111_?_11???? : errl_i <= 1'b1;
          14'b?_????00_?_000000 : errl_i <= 1'b1;
          14'b?_????11_?_111111 : errl_i <= 1'b1;
25    endcase
      end
      // reflect encoding for smaller table lookup
      // bit 13 remembers original encoding for msb-1 of output (out)
      always @(rfl_latch_p or cmdl)
30    //always @(rfl_latch_p or cmdt_i)
      begin
        if((rfl_latch_p[11:7]>{rfl_latch_p[1],rfl_latch_p[2],rfl_latch_p[3],
                    rfl_latch_p[4],rfl_latch_p[5]})&&!cmdl)
        begin
35        stg_latch_i <= {rfl_latch_p[0],rfl_latch_p[1],rfl_latch_p[2],rfl_latch_p[3],rfl_latch_p[4],
                    rfl_latch_p[5],rfl_latch_p[6],rfl_latch_p[7],rfl_latch_p[8],rfl_latch_p[9],
                    rfl_latch_p[10],rfl_latch_p[11],rfl_latch_p[12]};
          refl_i     <= 1'b1;
        end
40      else
        begin
          stg_latch_i <= rfl_latch_p;       refl_i    <= 1'b0;
        end
      end
45
```

55

```
// overdrive command bit if error has been found
assign   cmd_i    = cmdl_d | errl_d;

assign   out_i    = errl_d   ?  IDLE_OP:
                    cmdl_d   ?  out_c:
                                out_d[7:0];
assign   error_i  = errl_d;
// see if longest terms ar at front or rear
// assign encoding (combinatorial)
always @(stg_latch     or
        cmdl_d         or
        refl)
begin
    // code lookup for command
        case ({stg_latch[12:0]})
            IDLE    : begin out_c <= IDLE_OP; end
            COMM    : begin out_c <= COMM_OP; end
            ENC0    : begin out_c <= ENC0_OP; end
            ENC1    : begin out_c <= ENC1_OP; end
            ENC2    : begin out_c <= ENC2_OP; end
            ENC3    : begin out_c <= ENC3_OP; end
            ENC4    : begin out_c <= ENC4_OP; end
            ENC5    : begin out_c <= ENC5_OP; end
            ENC6    : begin out_c <= ENC6_OP; end
            ENC7    : begin out_c <= ENC7_OP; end
            ENC8    : begin out_c <= ENC8_OP; end
            ENC9    : begin out_c <= ENC9_OP; end
            ENCA    : begin out_c <= ENCA_OP; end
            ENCB    : begin out_c <= ENCB_OP; end
            default : begin out_c <= IDLE_OP; end
        endcase
end
assign   out_d[7] = stg_latch[6];          // set msb    = encode bit 6
assign   out_d[6] = refl;                  // set msb-1 = reflection
assign   out_d[5] =!(stg_latch[4] & stg_latch[3]);
assign   out_d[4] =!((stg_latch[8] & stg_latch[4] & stg_latch[3]) |
                    (stg_latch[9] & stg_latch[8]));
assign   out_d[3] =!((stg_latch[8] & stg_latch[4] & stg_latch[3] &
                     !stg_latch[7] & stg_latch[2])|
                    (stg_latch[4] & stg_latch[3] & stg_latch[10] & !stg_latch[8])|
                    (!(stg_latch[4] & stg_latch[3]) & stg_latch[9] & stg_latch[2] & stg_latch[1])|
                    (!(stg_latch[4] & stg_latch[3]) & !(stg_latch[9] & stg_latch[8]) &
                     stg_latch[1] & !stg_latch[11]));
assign   out_d[2] =!((!(!(stg_latch[10] & stg_latch[2] & !stg_latch[7]) &
                    !(stg_latch[7] & stg_latch[9]) & !(stg_latch[9] &
```

```
            !stg_latch[2])) & stg_latch[8] & stg_latch[4] & stg_latch[3])|
          (!(!(stg_latch[3] & stg_latch[4] & stg_latch[5]) & !(stg_latch[9] &
            stg_latch[1] & !stg_latch[11] & !stg_latch[3]) &
            !(stg_latch[9] & stg_latch[1] & !stg_latch[11] & !stg_latch[4]))
            & !stg_latch[8])|
          (!(!(stg_latch[3] & stg_latch[2] & stg_latch[1] &
            !stg_latch[4]) & !(!stg_latch[2] & !stg_latch[3] &
            !stg_latch[5]) & !(!stg_latch[1] & !stg_latch[3] & !stg_latch[5])) &
            stg_latch[9] & stg_latch[8])|
          (!(!(stg_latch[11] & !stg_latch[9]) & !(stg_latch[11] & !stg_latch[8]) &
            !(!stg_latch[1] & !stg_latch[9]) & !(!stg_latch[1] & !stg_latch[8])) &
            stg_latch[3] & !stg_latch[4]));
  assign  out_d[1] =!(((!(stg_latch[10] & !(!stg_latch[2] & stg_latch[8]) &
            !(stg_latch[8] & stg_latch[7]) & !(stg_latch[8] &
            stg_latch[5])) & stg_latch[1] & stg_latch[3] & stg_latch[4])|
          (stg_latch[11] & stg_latch[3] & stg_latch[4] & stg_latch[10] & !stg_latch[8])|
          (!(!stg_latch[11] & stg_latch[1]) & !(!(stg_latch[4] & !stg_latch[3] &
            !stg_latch[9]) & !(stg_latch[4] & !stg_latch[3] & !stg_latch[8]) &
            !(stg_latch[3] & stg_latch[8] & !stg_latch[4] & !stg_latch[9])))|
          (!(stg_latch[3] & stg_latch[4]) & !(!(!stg_latch[11] & !stg_latch[8]) &
            !(!stg_latch[11] & !stg_latch[9]) & !(stg_latch[9] & stg_latch[8] &
            stg_latch[7])) & stg_latch[1] & stg_latch[2])|
          (!(stg_latch[2] & stg_latch[1]) & !(!stg_latch[7] & !stg_latch[4]) &
            stg_latch[8] & stg_latch[9] & !stg_latch[3]));
  assign  out_d[0] =!((!(!(stg_latch[4] & stg_latch[3]) & !(!(stg_latch[9] & stg_latch[8] &
            stg_latch[7] & !stg_latch[1]) & !(stg_latch[9] & stg_latch[8] &
            stg_latch[10]) & !(stg_latch[11] & !stg_latch[10] & !stg_latch[8])))|
          (stg_latch[4] & stg_latch[3] & !stg_latch[8] & !(!(stg_latch[10] &
            stg_latch[11] & !stg_latch[9]) & !(stg_latch[10] & stg_latch[1] &
            !stg_latch[11]) & !(!stg_latch[10] & !stg_latch[11] & stg_latch[1]) &
            !(!stg_latch[10] & stg_latch[1] & !stg_latch[2])))|
          (stg_latch[4] & stg_latch[3] & stg_latch[8] & !(!(!stg_latch[7] &
            stg_latch[2] & !stg_latch[11] & stg_latch[10] & stg_latch[1]) &
            !(!stg_latch[7] & stg_latch[2] & !stg_latch[11] & !stg_latch[5]) &
            !(stg_latch[7] & stg_latch[2] & !stg_latch[1] & !stg_latch[5]) &
            !(stg_latch[10] & !stg_latch[11] & stg_latch[7] & stg_latch[1])))|
          (stg_latch[1] & !stg_latch[11] & !(stg_latch[9] & stg_latch[8]) &
            !(!(!stg_latch[3] & stg_latch[4]) & !(stg_latch[3] & !stg_latch[4] &
            stg_latch[2])))|
          (stg_latch[3] & stg_latch[11] & stg_latch[8] & !stg_latch[9] & !stg_latch[4]));
//---------------------
// clocked process
//---------------------
  always @(posedge clock or posedge reset)    // async reset
  //always @(posedge clock)                    // sync reset
```

57

```
       begin
         if (reset)
         begin
               din_latch    <=    IDLE;
 5             rfl_latch    <=    IDLE;
               stg_latch    <=    IDLE;
               out          <=    IDLE_OP;
               cmdl         <=    1'b1;
               cmdl_d       <=    1'b1;
10             errl    <= 1'b0;
               errl_d  <= 1'b0;
               refl         <=    1'b0;
               cmd          <=    1'b1;
           error     <= 1'b0;
15         pred      <= 4'b0;
         end
         else
         begin
               din_latch    <=    din;
20             rfl_latch    <=    rfl_latch_i;
               stg_latch    <=    stg_latch_i;
               out          <=    out_i;
               cmdl         <=    cmdl_i;
               cmdl_d    <= cmdl;
25             errl    <= errl_i;
               errl_d  <= errl;
               refl         <=    refl_i;
               cmd          <=    cmd_i;
               error     <= error_i;
30         pred      <= pred_i;
         end
       end
    endmodule
```

We claim:
1. A coding device for encoding data represented by input symbols into codes for serially transmitting the codes along a communication channel, the codes being represented in the channel by signals having a limited minimum and maximum pulse width and sampled by a receiver at each receiver's clock period, wherein the input symbols are encoded to have the minimum signal pulse width longer than one period of the receiver's sampling clock;
wherein the receiver takes multiple samples during each clock period to track the dynamic variation in the temporal or amplitude thresholds of the data to improve the overall coding efficiency.
2. A coding device according to claim 1, wherein the input symbols are encoded to have a minimum pulse width defined by the formula

$$\frac{1}{2\tau F},$$

where is a minimum bit interval providing a desired bit error rate of data, and F is the bandwidth of the channel.
3. A coding device according to claim 2, wherein the input symbols are coded to have a minimum signal pulse width which is at least twice longer than one period of the receiver's sampling clock.
4. A coding device according to claim 1, wherein the minimal pulse width is equal to 2 bit intervals.
5. A coding device means according to claim 1, wherein a code table is created according to which each symbol is assigned one or more codes.
6. A coding device according to claim 5, wherein the code table is created taking into account constraints selected from maximum and minimum pulse width, code word width and DC balance/unbalance of the signal in the channel.
7. A coding device according to claim 5, wherein 8 bit input symbols are encoded into a 13 bit output codes in accordance with the code table provided that, in a sequence of two codes, each bit, except for the first and the last bit of the sequence, must have the same left or right neighbor bit.
8. A coding device according to claim 6, wherein each input symbol corresponds to two codes, one code being from the first part of the table and the second code being from the second part;
codes presented in both parts of the table shall be assigned to the same input symbol;
within each code presented in the part of the table for negative current disparity, the sum of "1"s is equal to 8 or 9;
within each code presented in the part of the table for positive current disparity, the sum of "1"s is equal to 7 or 8;
the current disparity is negative when the previous code has 9 or 8 "1"s; and the previous state of disparity was negative, otherwise it is positive;
in any sequence of two codes, one code consisting of 8 "1"s and taken from one part of the table, and another one being any code taken from the same part of the table, each bit of the code must have the same left or right neighbor, except for the first and the last bit of the sequence;
in any sequence of two codes, one code consisting of the number of "1"s different from 8 and taken from one part of the table, and another code being any code taken from the other part of the table; each bit of the code must have the same left or right neighbor, except for the first and the last bit of the sequence;
the two parts of the table contain preferably equal number of codes.
9. A coding device according to claim 1 wherein the code table is reordered to provide the optimal coder implementation such as having minimal logical terms.
10. A coding device according to claim 1, implemented in hardware.
11. A coding device according to claim 1 selected from a hub, a switch, router, modem or processor.
12. A coding device means according to claim 1, implemented in logic synthesised or created from a table listing of the code alphabet.
13. A coding device according to claim 1, implemented in a lookup table.
14. A coding device means according to claim 5 wherein the code table is split into subtables and an intermediate code computed from which the final code is determined.
15. A method of coding data represented by input symbols into codes for transmitting along a communication channel, comprising a transmitter for serially transmitting the codes represented in the channel by signals having a limited minimum and maximum pulse width and a receiver for sampling data at each clock period,
wherein the input symbols are encoded to have the minimum signal pulse width longer than one period of the receiver's sampling clock, and wherein the receiver takes multiple samples during each clock period to track the dynamic variation in the temporal or amplitude thresholds of the data to improve the overall coding efficiency.
16. A method of data communication comprising the steps of coding input data, transmitting the obtained output codes and sampling the output codes at a receiver at each clock period, wherein the coding is performed so that the output codes have the minimum signal pulse width longer than one period of the receiver's sampling clock, and wherein the receiver takes multiple samples during each clock period to track the dynamic variation in the temnoral or amplitude thresholds of the data to improve the overall coding efficiency.
17. The method of data communication as claimed in claim 15, further comprising a step of decoding output codes to obtain respective output symbols.
18. A communication apparatus for transmitting and receiving digital data, comprising:
a coder for coding data represented by input symbols into codes;
a transmitter for serially transmitting along a communication channel the codes represented in the channel by signals having a limited minimum and maximum pulse width; and
a receiver for sampling data signals at each clock period, wherein the coder codes input symbols to have the minimum signal pulse width longer than one period of the receiver's sampling clock, so that 8 bit input symbols are encoded into 16 bit output codes according to a code table created to produce a DC balanced signal and containing two parts of codes, one part for coding symbols with negative current disparity, and another part for coding symbols with positive current disparity, the table being such that:
each input symbol corresponds to two codes, one code being from the first part of the table and the second code being from the second part;

codes presented in both parts of the table shall be assigned to the same input symbol;

within each code presented in the part of the table for negative current disparity, the sum of "1"s is equal to 8 or 9; within each code presented in the part of the table for positive current disparity, the sum of "1"s is egual to 7 or 8; the current disparity is negative when the previous code has 9 or 8"1"s: and the previous state of disparity was negative, otherwise it is positive;

in any sequence of two codes, one code consisting of 8"1"s and taken from one part of the table, and another one being any code taken from the same part of the table, each bit of the code must have the same left or right neighbor;

in any sequence of two codes, one code consisting of the number of "1"s different from 8 and taken from one part of the table, and another code being any code taken from the other part of the table; each bit of the code must have the same left or right neighbor;

the two parts of the table contain equal number of codes.

19. A communication apparatus as claimed in claim 18 wherein the minimal pulse width is equal to 2 bit intervals.

20. A communication apparatus as claimed in claim 18, further comprising a decoder for decoding codes received by the receiver into respective output symbols.

21. A communication apparatus for transmitting and receiving digital data, comprising:

a coder for coding data represented by input symbols into codes;

a transmitter for serially transmitting along a communication channel the codes represented in the channel by signals having a limited minimum and maximum pulse width; and a receiver for sampling data signals at each clock period;

wherein the coder codes input symbols to have the minimum signal pulse width longer than one period of the receiver's sampling clock; and wherein the receiver takes multiple samples during each clock period to track the dynamic variation in the temporal or amplitude thresholds of the data to improve the overall coding efficiency.

22. A communication apparatus for transmitting and receiving digital data, comprising:

a coder for coding data represented by input symbols into codes;

a transmitter for serially transmitting along a communication channel the codes represented in the channel by signals having a limited minimum and maximum pulse width; and a receiver for sampling data signals at each clock period, wherein the coder codes input symbols to have the minimum signal pulse width longer than one period of the receiver's sampling clock; and wherein the samples taken by the receiver are spread in time around a regular sampling clock that enables the dynamic shift in the received data to be tracked by matching shifts in the sampling clock or inverse shifts in delay circuitry within the receiver.

* * * * *